(12) United States Patent
Khatkale

(10) Patent No.: US 11,914,548 B1
(45) Date of Patent: Feb. 27, 2024

(54) FLOW MODEL COMPUTATION SYSTEM WITH DISCONNECTED GRAPHS

(71) Applicant: SAS Institute Inc., Cary, NC (US)

(72) Inventor: Shyam Kashinath Khatkale, Pune (IN)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/207,432

(22) Filed: Jun. 8, 2023

Related U.S. Application Data

(60) Provisional application No. 63/444,882, filed on Feb. 10, 2023, provisional application No. 63/443,889, filed on Feb. 7, 2023, provisional application No. 63/439,488, filed on Jan. 17, 2023.

(30) Foreign Application Priority Data

Aug. 25, 2022 (IN) .............................. 202211048596

(51) Int. Cl.
*G06F 15/82* (2006.01)
*G06F 11/34* (2006.01)

(52) U.S. Cl.
CPC ........ *G06F 15/825* (2013.01); *G06F 11/3495* (2013.01)

(58) Field of Classification Search
None
See application file for complete search history.

(56) References Cited

U.S. PATENT DOCUMENTS

| | | | |
|---|---|---|---|
| 7,634,431 B2 | 12/2009 | Stratton | |
| 7,813,948 B2 | 10/2010 | Ratzloff | |
| 8,024,241 B2 | 9/2011 | Bailey et al. | |
| 10,310,896 B1 * | 6/2019 | Kichak | G06F 9/4843 |
| 10,908,977 B1 * | 2/2021 | Ferstay | G06F 11/3476 |
| 11,709,796 B2 * | 7/2023 | Hornung | G06F 15/7867 |
| | | | 712/201 |
| 2006/0080410 A1 * | 4/2006 | Maclarty | H04L 61/4541 |
| | | | 709/220 |
| 2012/0182991 A1 * | 7/2012 | Vazquez | H04L 45/02 |
| | | | 370/390 |

(Continued)

OTHER PUBLICATIONS

Wikipedia, "Tarjan's strongly connected components algorithm" https://en.wikipedia.org/wiki/Tarjan%27s_strongly_connected_components_algorithm, pp. 1-4, printed Mar. 14, 2023.

(Continued)

*Primary Examiner* — Eric Coleman
(74) *Attorney, Agent, or Firm* — Bell & Manning, LLC

(57) ABSTRACT

A computing device determines a node traversal order for computing a computational parameter value for each node of a data model of a system that includes a plurality of disconnected graphs. The data model represents a flow of a computational parameter value through the nodes from a source module to an end module. A flow list defines an order for selecting and iteratively processing each node to compute the computational parameter value in a single iteration through the flow list. Each node from the flow list is selected to compute a driver quantity for each node. Each node is selected from the flow list in a reverse order to compute a driver rate and the computational parameter value for each node. The driver quantity or the computational parameter value is output for each node to predict a performance of the system.

30 Claims, 15 Drawing Sheets

(56) References Cited

U.S. PATENT DOCUMENTS

| | | | | |
|---|---|---|---|---|
| 2015/0039431 A1* | 2/2015 | Sarshar | ............. | G06Q 30/0256 |
| | | | | 705/14.54 |
| 2015/0288569 A1* | 10/2015 | Agarwal | ................. | H04L 41/12 |
| | | | | 709/224 |
| 2015/0331960 A1* | 11/2015 | Nickel | ................. | G06F 16/972 |
| | | | | 715/748 |
| 2016/0330301 A1* | 11/2016 | Raindel | .............. | H04L 63/0485 |

OTHER PUBLICATIONS

Robert Tarjan, "Depth-first search and linear graph algorithms" SIAM J. Comput. vol. 1 No. 2 pp. 146-160 (1972).

SAS Institute Inc., "SAS® Cost and Profitability Management 8.3: User's Guide" pp. 1-818, May 9, 2018.

\* cited by examiner

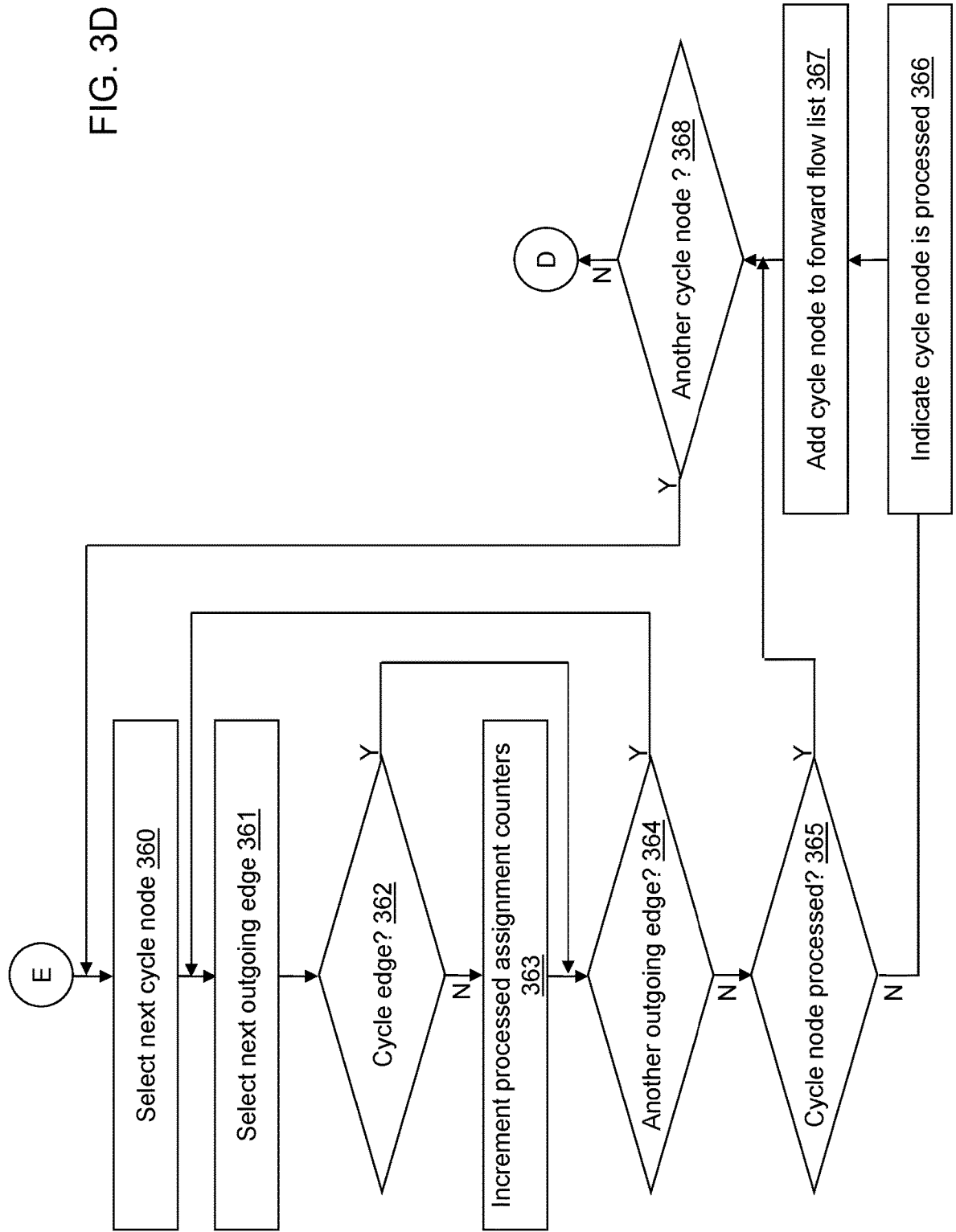

FLOW MODEL COMPUTATION SYSTEM WITH DISCONNECTED GRAPHS

CROSS-REFERENCE TO RELATED APPLICATIONS

The present application claims the benefit of and priority under 35 U.S.C. § 119(e) to U.S. Provisional Patent Application No. 63/439,488 filed Jan. 17, 2023, to U.S. Provisional Patent Application No. 63/443,889 filed Feb. 7, 2023, and to U.S. Provisional Patent Application No. 63/444,882 filed Feb. 10, 2023, the entire contents of which are hereby incorporated by reference. The present application also claims the benefit of and priority under 35 U.S.C. § 119(e) to Indian Provisional Patent Application No. 202211048596 filed Aug. 25, 2022, the entire contents of which are hereby incorporated by reference.

BACKGROUND

To perform flow model computations for a data model of a system, all of the nodes are traversed including all of the edges that connect nodes in the data model. Generally, initial incoming edges are not created for the nodes from which the flow computation begins. Similarly, final outgoing edges are not created from the nodes at which the flow computation ends. Without the initial incoming edges and the final outgoing edges, the data model includes a plurality of disconnected graphs. Before traversing the plurality of disconnected graphs, the disconnected graphs in the data model are connected to create a single connected graph by adding dummy nodes and edges to the data model. The nodes and edges are then traversed recursively in the single connected graph. If the data model has millions of nodes connected through billions of edges, the process of creating a single connected graph involves both wasted processing time and memory usage relative to direct processing of the disconnected graphs and managing the single connected graph becomes complex.

SUMMARY

In an example embodiment, a non-transitory computer-readable medium is provided having stored thereon computer-readable instructions that, when executed by a computing device, cause the computing device to determine a node traversal order for computing a flow value through a data model of a system that includes a plurality of disconnected graphs. A flow list is determined from a data model of a system. The data model is described by nodes connected by edges. An edge is between a pair of nodes that include a source node and a destination node. A directivity of the edge is from the source node to the destination node. The data model includes a plurality of modules. The nodes are distributed among the plurality of modules such that each node is included in a single module of the plurality of modules to define one or more module nodes included in each module. The plurality of modules includes a source module and an end module. The data model represents a flow of a computational parameter value through the nodes from the source module to the end module. Each node is connected to at least one other node in a same module or another module of the plurality of modules. The flow list defines an order for selecting and iteratively processing each node to compute the computational parameter value in a single iteration through the flow list. Each node from the flow list is selected to compute a driver quantity for each node. Each node is selected from the flow list in a reverse order to compute a driver rate and the computational parameter value for each node. The driver quantity or the computational parameter value is output for each node to predict a performance of the system.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to determine a node traversal order for computing a computational parameter value for each node of a data model of a system that includes a plurality of disconnected graphs.

In an example embodiment, a method is provided to determine a node traversal order for computing a computational parameter value for each node of a data model of a system that includes a plurality of disconnected graphs.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 2 and 3A through 3D depict a flow diagram illustrating examples of operations performed by a flow order determination application of the flow order determination device of FIG. 1 in accordance with an illustrative embodiment.

DETAILED DESCRIPTION

A flow order determination application 122 (shown referring to FIG. 1) determines a forward flow list and/or a reverse flow list that are used to compute values associated with nodes of a data model of a system using a plurality of disconnected graphs without creating a single, fully connected graph. As further discussed below, a flow computation application 822 (shown referring to FIG. 8) computes the values associated with the nodes of the data model in a distinct iterative process using the created flow lists. One or more values of parameters associated with the nodes of the data model can be modified yet only the flow computation process is repeated by flow computation application 822 because the flow list determination process is distinct from the flow computation process and remains unchanged as long as the nodes and their connectivity remain unchanged. Flow order determination application 122 and flow computation application 822 perform the flow computations significantly faster and use less memory in comparison to existing methods.

Though the term "list" is used herein, it should be understood that any data structure configured to maintain an ordered set of items can be used. The term "list" is used for simplicity. It should also be understood that the values computed based on the data model may vary based on the type of system that is represented by the data model. The application areas encompass any system representable by graph data modeling with a quantity flowing from one or more initial source nodes through intermediate nodes to one or more end nodes or vice versa. Merely for illustration, the data model may represent a demand and cost flow model where the nodes represent accounts, and the edges represent assignments between the accounts. The "cost" may represent an expenditure of any resource whether it is monetary, time, a material or component included in manufacture of a product, etc. For example, other measures or computational parameter values that can flow through a system include energy consumption, gas consumption, employee usage, etc. Flow order determination application 122 and flow computation application 822 can be used to predict resource and capacity needs of the system simulated by the data model.

Figure 11:
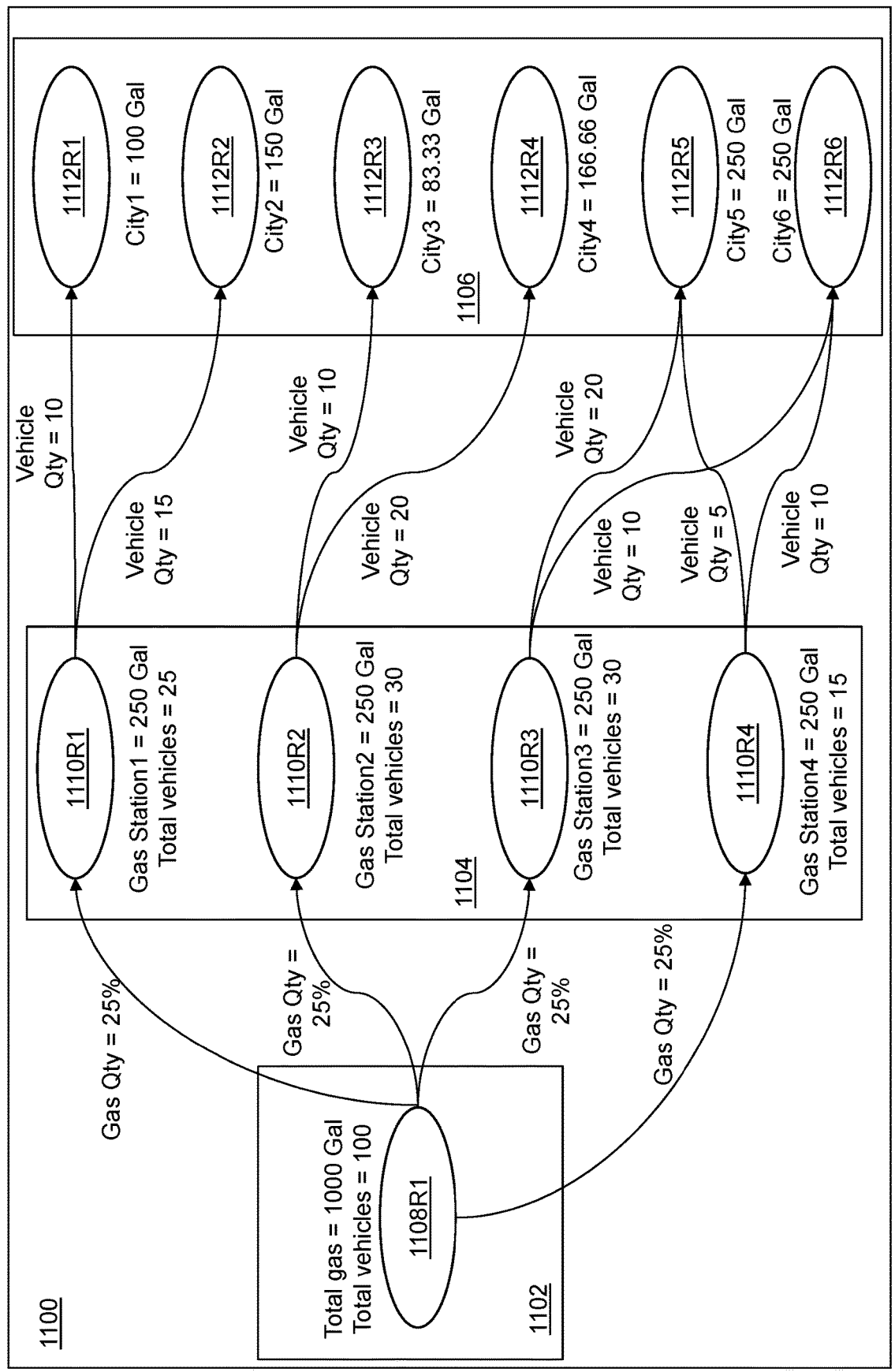
FIG. 11 shows a gas consumption data model in accordance with an illustrative embodiment.

For example, referring to FIG. 11, a graph 1100 of a gas consumption data model is shown in accordance with an illustrative embodiment. Graph 1100 includes a source module 1102, an intermediate module 1104, and an end module 1106. Source module 1102 includes a first source node 1108R1. Intermediate module 1104 includes a first intermediate node 1110R1, a second intermediate node 1110R2, a third intermediate node 1110R3, and a fourth intermediate node 1110R4. End module 1106 includes a first end node 1112R1, a second end node 1112R2, a third end node 1112R3, a fourth end node 1112R4, a fifth end node 1112R5, and a sixth end node 1112R6. In graph 1100, source module 1102 includes sources of gas; intermediate module 1104 includes gas stations one through four; and end module 1106 includes cities one through six. Graph 1100 simulates a gas flow from a gas source represented by first source node 1108R1 across six different cities represented by first end node 1112R1, second end node 1112R2, third end node 1112R3, fourth end node 1112R4, fifth end node 1112R5, and sixth end node 1112R6 through four different gas stations represented by first intermediate node 1110R1, second intermediate node 1110R2, third intermediate node 1110R3, and fourth intermediate node 1110R4 based on a number or quantity of vehicles.

First source node 1108R1 is connected as a source to first intermediate node 1110R1, second intermediate node 1110R2, third intermediate node 1110R3, and fourth intermediate node 1110R4 through edges. First source node 1108R1 does not include any incoming connections and, thus, is not connected to a source node. Thus, first source node 1108R1 only includes outgoing connections to destination nodes. First intermediate node 1110R1, second intermediate node 1110R2, third intermediate node 1110R3, and fourth intermediate node 1110R4 are destination nodes of first source node 1108R1.

First intermediate node 1110R1 is connected as a source to first end node 1112R1 and to second end node 1112R2 through edges. Second intermediate node 1110R2 is connected as a source to third end node 1112R3 and to fourth end node 1112R4 through edges. Third intermediate node 1110R3 is connected as a source to fifth end node 1112R5 and to sixth end node 1112R6 through edges. Fourth intermediate node 1110R4 is connected as a source to fifth end node 1112R5 and to sixth end node 1112R6 through edges.

First end node 1112R1, second end node 1112R2, third end node 1112R3, fourth end node 1112R4, fifth end node 1112R5, and sixth end node 1112R6 do not include any outgoing connections and, thus, are not connected to a destination node. Thus, first end node 1112R1, second end node 1112R2, third end node 1112R3, fourth end node 1112R4, fifth end node 1112R5, and sixth end node 1112R6 only include incoming connections from source nodes.

In the illustrative embodiment of FIG. 11, the total amount of gas at first source node 1108R1 is 1000 gallons with a total number of vehicles of 100. A demand for the gas flows from the vehicles associated with each city through gas stations to the source of the gas. The gas flows from the source to each city to represent how much gas is consumed by the city vehicles associated with each city based on which gas station is used. The gas quantity is split by equal percentage to the four gas stations such that each gas station has 250 gallons of gas. The vehicle quantity was predefined for each city as the first city had 10 vehicles, the second city had 15 vehicles, the third city had 10 vehicles, the fourth city had 20 vehicles, the fifth city had 25 vehicles, and the sixth city had 20 vehicles. The vehicle quantity could have been defined by actual number of by percentage. The flow of the demand for the gas flows from end module 1106 to source module 1102 through intermediate module 1104 to result in the gas and vehicle quantities shown. Based on the analysis the gas usage can be optimized.

Figure 4:
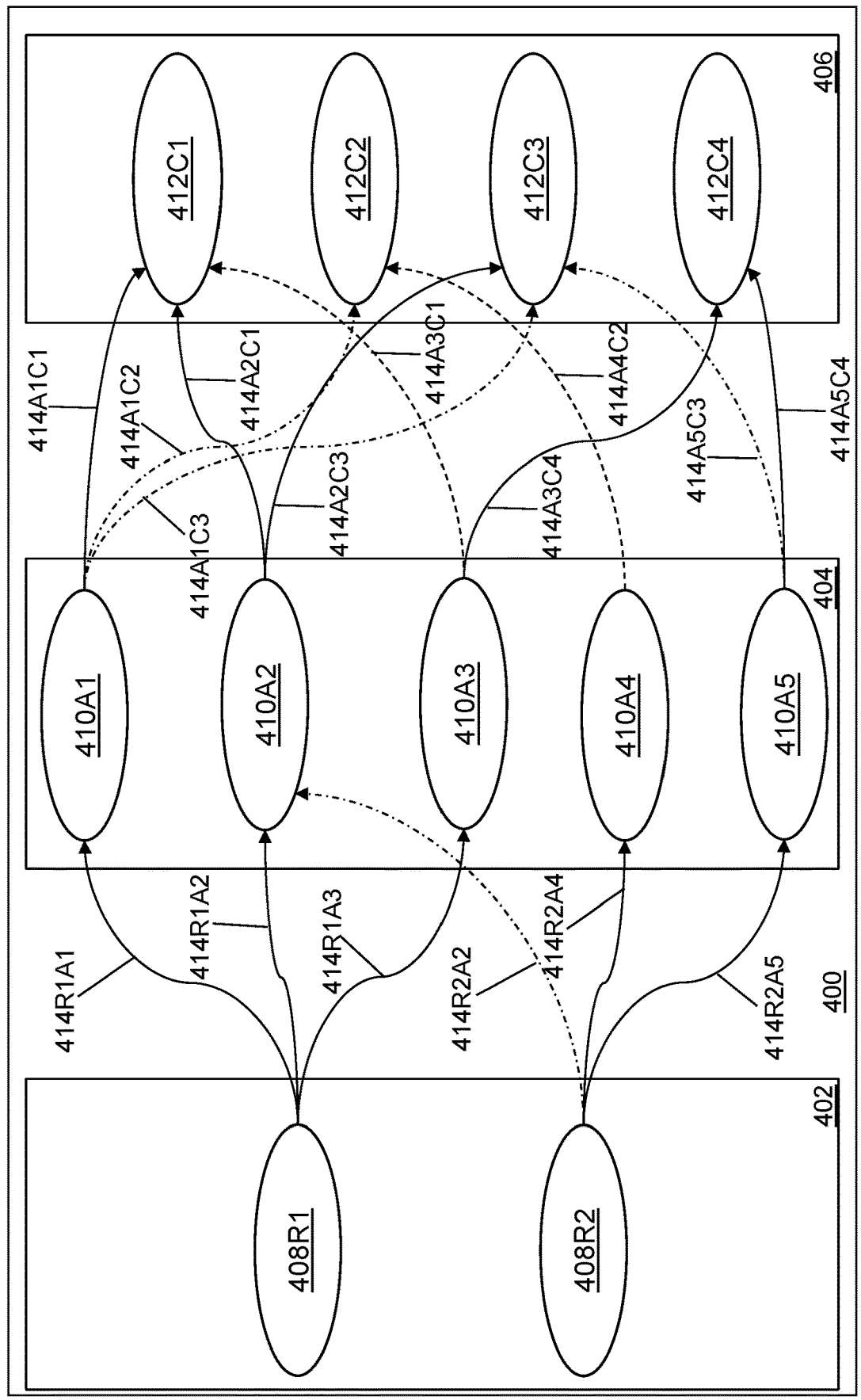
FIG. 4 shows a data model in accordance with an illustrative embodiment.

Referring to FIG. 4, a graph 400 of a data model is shown in accordance with an illustrative embodiment. Graph 400 includes a source module 402, an intermediate module 404, and an end module 406. Source module 402 includes a first source node 408R1 and a second source node 408R2. Intermediate module 404 includes a first intermediate node 410A1, a second intermediate node 410A2, a third intermediate node 410A3, a fourth intermediate node 410A4, and a fifth intermediate node 410A5. End module 406 includes a first end node 412C1, a second end node 412C2, a third end node 412C3, and a fourth end node 412C4.

First source node 408R1 is connected as a source to first intermediate node 410A1 through a first edge 414R1A1, to second intermediate node 410A2 through a second edge 414R1A2, and to third intermediate node 410A3 through a third edge 414R1A3. Second source node 408R2 is connected as a source to second intermediate node 410A2 through a fourth edge 414R2A2, to fourth intermediate node 410A4 through a fifth edge 414R2A4, and to fifth intermediate node 410A5 through a sixth edge 414R2A5. First source node 408R1 and second source node 408R2 do not include any incoming connections and, thus, are not connected to a source node. Thus, first source node 408R1 and second source node 408R2 only include outgoing connections to destination nodes.

First source node 408R1 is a source node of first intermediate node 410A1, second intermediate node 410A2, and third intermediate node 410A3. First intermediate node 410A1, second intermediate node 410A2, and third intermediate node 410A3 are destination nodes of first source node 408R1. Similarly, second source node 408R2 is a source node of second intermediate node 410A2, fourth intermediate node 410A4, and fifth intermediate node 410A5. Second intermediate node 410A2, fourth intermediate node 410A4, and fifth intermediate node 410A5 are destination nodes of second source node 408R2.

First edge 414R1A1, second edge 414R1A2, and third edge 414R1A3 are outgoing connections from first source node 408R1 and are incoming connections to first intermediate node 410A1, to second intermediate node 410A2, and to third intermediate node 410A3, respectively. Fourth edge 414R2A2, fifth edge 414R2A4, and sixth edge 414R2A5 are outgoing connections from second source node 408R2 and are incoming connections to second intermediate node 410A2, to fourth intermediate node 410A4, and to fifth intermediate node 410A5, respectively.

First intermediate node 410A1 is connected as a source to first end node 412C1 through a seventh edge 414A1C1, to second end node 412C2 through an eighth edge 414A1C2, and to third end node 412C3 through a ninth edge 414A1C3. Second intermediate node 410A2 is connected as a source to first end node 412C1 through a tenth edge 414A2C1 and to third end node 412C3 through an eleventh edge 414A2C3. Third intermediate node 410A3 is connected as a source to first end node 412C1 through a twelfth edge 414A3C1 and to fourth end node 412C4 through a thirteenth edge 414A3C4. Fourth intermediate node 410A4 is connected as a source to second end node 412C2 through a fourteenth edge 414A4C2. Fifth intermediate node 410A5 is connected as a source to third end node 412C3 through a fifteenth edge 414A5C3 and fourth end node 412C4 through a sixteenth edge 414A5C4. First end node 412C1, second end node 412C2, third end node 412C3, and fourth end node 412C4 do not include any outgoing connections and, thus, are not connected to a destination node. Thus, first end node 412C1, second end node 412C2, third end node 412C3, and fourth end node 412C4 only include incoming connections from source nodes.

A data model can include source module 402, end module 406, and any number of intermediate modules. Each module can include any number of nodes. Nodes in any module can flow directly to a node in any other module as long as the edges all flow in a common direction from left to right as in the illustrative embodiment or right to left in an alternative embodiment. For example, first source node 408R1 could be a direct source node connected to any node of end module 406.

Figure 5:
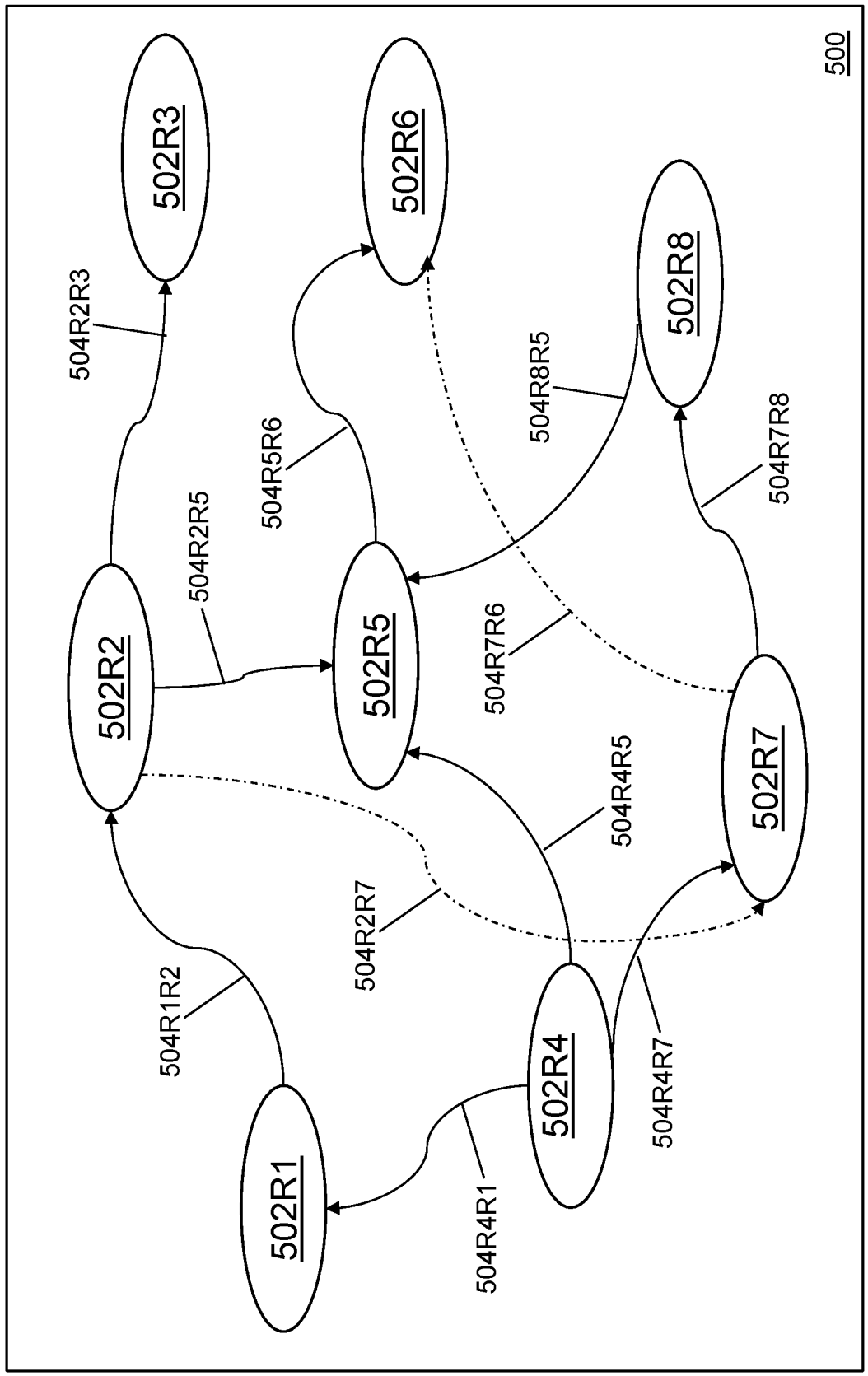
FIG. 5 shows a module of a data model with dependencies in accordance with an illustrative embodiment.

Nodes within a module can connect to each other to create an intra-module connection. For example, referring to FIG. 5, a module subgraph 500 is shown in accordance with an illustrative embodiment. Module subgraph 500 may include a first node 502R1, a second node 502R2, a third node 502R3, a fourth node 502R4, a fifth node 502R5, a sixth node 502R6, a seventh node 502R7, and an eighth node 502R8. Though not shown, fourth node 502R4 may include a connection from a source node included in a preceding module, where preceding is defined as a module from which a connection is defined to module subgraph 500 or may include a connection from another node of the same module. Though not shown, third node 502R3 and/or sixth node 502R6 may include a connection to a destination node included in a succeeding module, where succeeding is defined as a module to which a connection is made from module subgraph 500, or may include a connection to another node of the same module.

Fourth node 502R4 is connected as a source to first node 502R1 through a first intra-module edge 504R4R1, to fifth node 502R5 through a second intra-module edge 504R4R5, and to seventh node 502R7 through a third intra-module edge 504R4R7. First node 502R1 is connected as a source to second node 502R2 through a fourth intra-module edge 504R1R2. Second node 502R2 is connected as a source to third node 502R3 through a fifth intra-module edge 504R2R3, to fifth node 502R5 through a sixth intra-module edge 504R2R5, and to seventh node 502R7 through a seventh intra-module edge 504R2R7. Seventh node 502R7 is connected as a source to sixth node 502R6 through an eighth intra-module edge 504R7R6 and to eighth node 502R8 through a ninth intra-module edge 504R7R8. Fifth node 502R5 is connected as a source to sixth node 502R6 through a tenth intra-module edge 504R5R6. Eighth node 502R8 is connected as a source to fifth node 502R5 through an eleventh intra-module edge 504R8R5.

Figure 6:
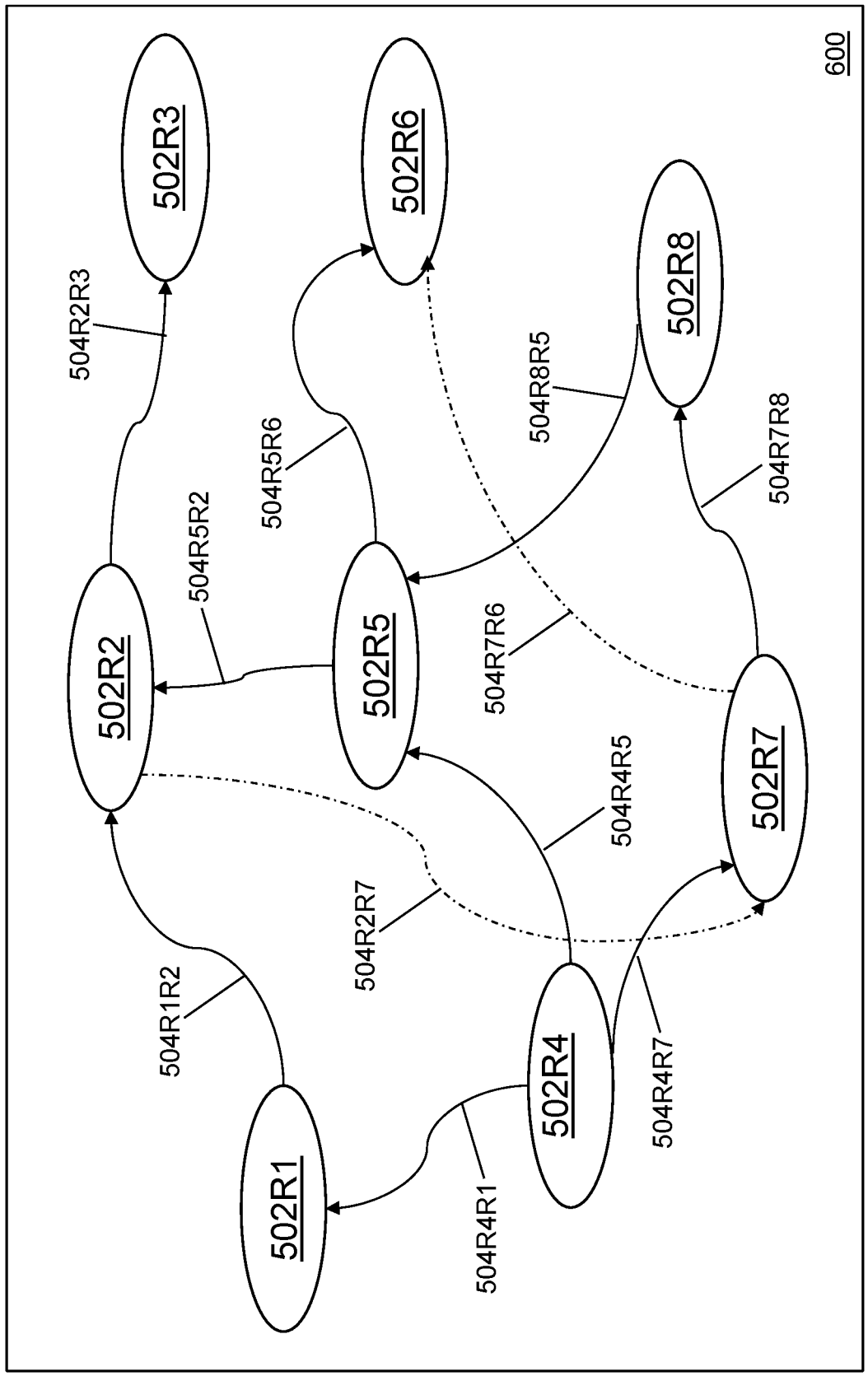
FIG. 6 shows a module of a data model with dependencies and a cycle in accordance with an illustrative embodiment.

Nodes within a module can connect to each other to create a cycle in which a reciprocal edge connects to at least one node. For example, referring to FIG. 6, a second module subgraph 600 is shown in accordance with an illustrative embodiment. Module subgraph 500 and second module subgraph 600 are identical except that fifth node 502R5 is connected as a source to second node 502R2 through a twelfth intra-module edge 504R5R2 instead of second node 502R2 being connected as a source to fifth node 502R5 through sixth intra-module edge 504R2R5. Thus, second module subgraph 600 may include first node 502R1, second node 502R2, third node 502R3, fourth node 502R4, fifth node 502R5, sixth node 502R6, seventh node 502R7, and eighth node 502R8 connected in an identical manner to module subgraph 500 except that fifth node 502R5 is connected as a source to second node 502R2 through twelfth intra-module edge 504R5R2 instead of second node 502R2 being connected as a source to fifth node 502R5 through sixth intra-module edge 504R2R5.

The reversal of the edge between second node 502R2 and fifth node 502R5 forms a cycle. The cycle includes second node 502R2, seventh node 502R7, eighth node 502R8, and fifth node 502R5. The cycle is created when fifth node 502R5 is connected as a source to second node 502R2 because a connection loop starts at and then returns to second node 502R2. For illustration, all of the nodes of module subgraph 500 may be included in the list of intra-module connected nodes for the module, and second node 502R2, seventh node 502R7, eighth node 502R8, and fifth node 502R5 may be included in a list of cycle nodes for the module. All of the edges included in module subgraph 500 may be included in the list of intra-module connected edges for the module defined at least partially by second module subgraph 600.

Figure 1:
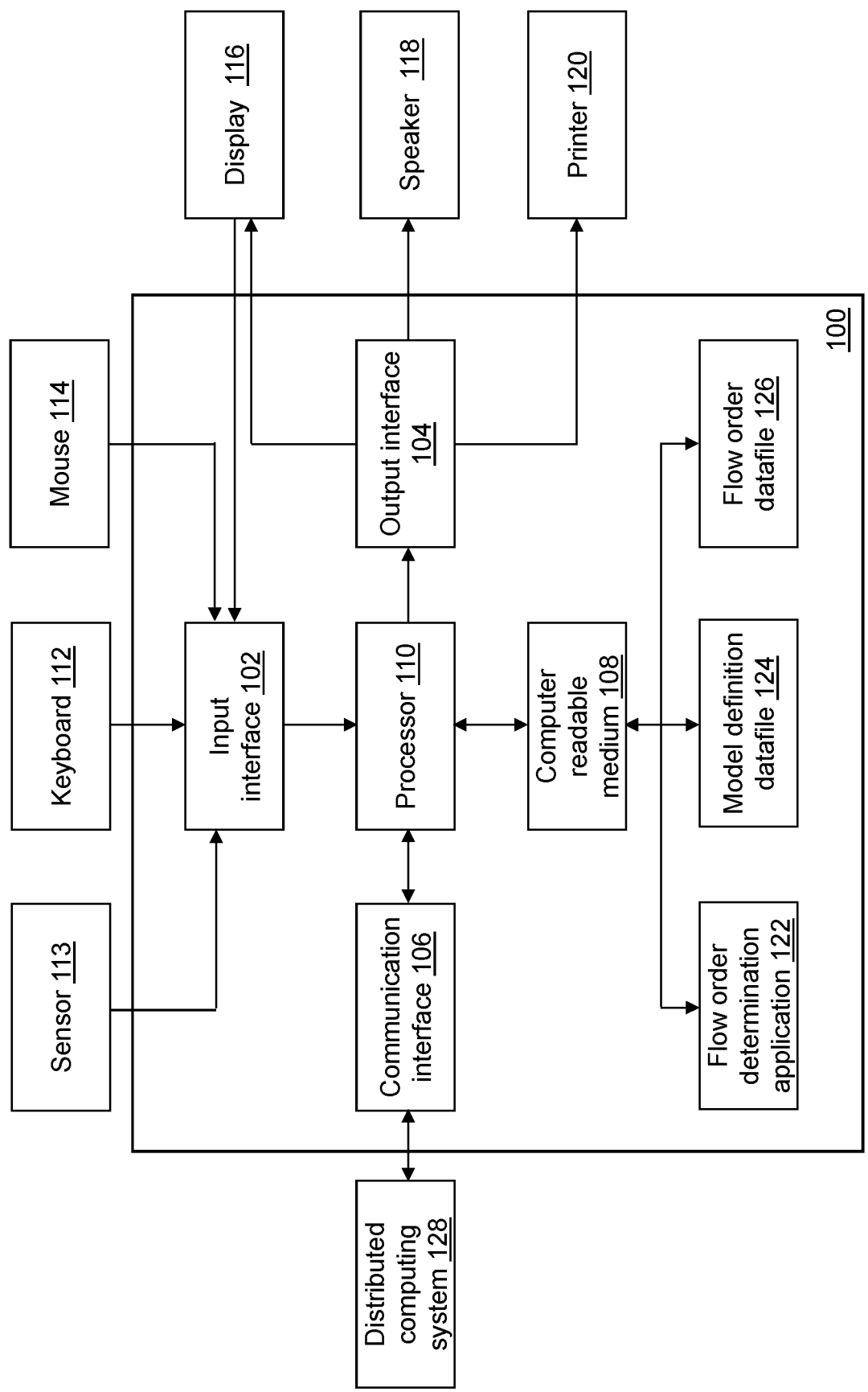
FIG. 1 depicts a block diagram of a flow order determination device in accordance with an illustrative embodiment.

Referring to FIG. 1, a block diagram of a flow order determination device 100 is shown in accordance with an illustrative embodiment. Flow order determination device 100 may include an input interface 102, an output interface 104, a communication interface 106, a non-transitory computer-readable medium 108, a processor 110, flow order determination application 122, a model definition datafile 124, and a flow order datafile 126. Flow order determination application 122 determines a forward flow list and/or a reverse flow list. When created, the forward flow list and the reverse flow list each include an ordered set of nodes of a data model defined by the characteristics included in and read from model definition datafile 124. Fewer, different, and/or additional components may be incorporated into flow order determination device 100.

Input interface 102 provides an interface for receiving information from the user or another device for entry into flow order determination device 100 as understood by those skilled in the art. Input interface 102 may interface with various input technologies including, but not limited to, a keyboard 112, a sensor 113, a mouse 114, a display 116, a track ball, a keypad, one or more buttons, etc. to allow the user to enter information into flow order determination device 100 or to make selections presented in a user interface displayed on display 116.

The same interface may support both input interface 102 and output interface 104. For example, display 116 comprising a touch screen provides a mechanism for user input and for presentation of output to the user. Flow order determination device 100 may have one or more input interfaces that use the same or a different input interface technology. The input interface technology further may be accessible by flow order determination device 100 through communication interface 106.

Output interface 104 provides an interface for outputting information for review by a user of flow order determination device 100 and/or for use by another application or device. For example, output interface 104 may interface with various output technologies including, but not limited to, display 116, a speaker 118, a printer 120, etc. Flow order determination device 100 may have one or more output interfaces that use the same or a different output interface technology. The output interface technology further may be accessible by flow order determination device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Flow order determination device 100 may have one or more communication interfaces that use the same or a different communication interface technology. For example, flow order determination device 100 may support communication using an Ethernet port, a Bluetooth® antenna, a telephone jack, a USB port, etc. Data and/or messages may be transferred between flow order determination device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Flow order determination device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Flow order determination device 100 also may have one or more drives that support the loading of a memory media such as a CD, DVD, an external hard drive, etc. One or more external hard drives further may be connected to flow order determination device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Flow order determination device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Flow order determination application 122 may perform operations associated with determining the forward flow list and/or the reverse flow list. The forward flow list and/or the reverse flow list can be used to compute values for nodes of the data model, for example, using flow computation application 822. Some or all of the operations described herein may be embodied in flow order determination application 122. The operations may be implemented using hardware, firmware, software, or any combination of these methods. Flow order determination application 122 and flow computation application 822 may be integrated into a single application or may be separately executable applications. Though not described herein, a model definition application used to define the data model may further be integrated with flow order determination application 122 such that the data model may not be predefined and stored in model definition datafile 124 but may already be stored in-memory through use of the model definition application. For illustration, the SAS® Cost and Profitability Management 8.3: User's Guide published by SAS Institute Inc. of Cary, North Carolina on May 9, 2018 (CPM User's Guide) describes a model definition application in accordance with an illustrative embodiment. The CPM User's Guide describes the creation of data models and the processing of the data models to compute a flow of resources through activities defined by the data model. For example, the cost of the activities may be flowed through to cost objects. However, as described further below the method described in the CPM User's Guide to perform the computations requires more computer memory and more computing time than that used by flow order determination application 122 and flow computation application 822.

Referring to the example embodiment of FIG. 1, flow order determination application 122 is implemented in software (comprised of computer-readable and/or computer-executable instructions) stored in computer-readable medium 108 and accessible by processor 110 for execution of the instructions that embody the operations of flow order determination application 122. Flow order determination application 122 may be written using one or more programming languages, assembly languages, scripting languages, etc. Flow order determination application 122 may be integrated with other analytic tools. As an example, flow order determination application 122 may be part of an integrated data analytics software application and/or software architecture such as that offered by SAS Institute Inc. of Cary, North Carolina, USA. Merely for illustration, flow order determination application 122 may be implemented using or integrated with one or more SAS software tools such as Base SAS, SAS® Enterprise Miner™, SAS® Event Stream Processing, SAS/STATO, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/ORO, SAS/ETSO, SAS® Visual Analytics, SAS® Viya™, SAS® Optimization, SAS® Econometrics, SAS In-Memory Statistics for Hadoop®, SAS® Cost and Profitability Management, etc. all of which are developed and provided by SAS Institute Inc. of Cary, North Carolina, USA. Data mining, statistical analytics, and response flow computation are practically applied in a wide variety of industries to solve technical problems.

Flow order determination application 122 may be implemented as a Web application. For example, flow order determination application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Model definition datafile 124 may include parameters that define a data model comprised of a plurality of disconnected graphs. For illustration, model definition datafile 124 may store a data model using a "model" data container as described in the CPM User's Guide. As already described, the data model is organized into a plurality of modules where edges connect nodes from one or more initial source nodes to one or more end nodes through zero or more intermediate modules. The one or more initial source nodes are included in a source module. The one or more end nodes are included in an end module. One or more intermediate nodes are included in one or more intermediate modules. Each module includes a set of nodes, where the plurality of modules forms an ordered set of sets of nodes also referred to as accounts that flow a computational parameter value such as a cost. A node in one module can flow the computational parameter value to any other node, including itself, in any module after its own module in a direction determined by the module order.

A node is a point in the data model where the computational parameter values accumulate in the data model. A computational parameter element is associated with each node and is a sum of the computational parameter values received from one or more source nodes of the respective node also referred to as a received element value and/or an initial value defined as an input value for the respective node also referred to as an entered element value. A driver element is associated with each node and indicates a method by which the computational parameter element value is distributed from the respective node to one or more destination nodes of the respective node. For example, the driver element may indicate to distribute the computational parameter element value evenly between the destination nodes, to distribute the computational parameter element value based on a percentage value defined for each edge from the respective node to a respective destination node, to distribute the computational parameter element value based on a predefined formula where the predefined formula may be defined by a user or predefined as an optional formula in the application used to create the data model.

Model definition datafile 124 may be stored on computer-readable medium 108 or on one or more computer-readable media of a distributed computing system 128 and accessed by flow order determination device 100 using communication interface 106 and/or input interface 102. The data may be organized using delimited fields, such as comma or space separated fields, fixed width fields, using a SAS® dataset, etc. The SAS dataset may be a SAS® file stored in a SAS® library that a SAS® software tool creates and processes.

Model definition datafile 124 may be stored using various data structures as known to those skilled in the art including one or more files of a file system, a relational database, one or more tables of a system of tables, a structured query language database, etc. on flow order determination device 100 or on distributed computing system 128.

Flow order determination device 100 may coordinate access to model definition datafile 124 that is distributed across distributed computing system 128 that may include one or more computing devices. For example, model definition datafile 124 may be stored in a cube distributed across a grid of computers as understood by a person of skill in the art. As another example, model definition datafile 124 may be stored in a multi-node Hadoop® class. For instance, Apache™ Hadoop® is an open-source software framework for distributed computing supported by the Apache Software Foundation. As another example, model definition datafile 124 may be stored in a cloud of computers and accessed using cloud computing technologies, as understood by a person of skill in the art. The SAS® LASR™ Analytic Server may be used as an analytic platform to enable multiple users to concurrently access data stored in model definition datafile 124. The SAS Viya open, cloud-ready, in-memory architecture also may be used as an analytic platform to enable multiple users to concurrently access data stored in model definition datafile 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Referring to FIGS. 2 and 3A through 3D, example operations associated with flow order determination application 122 are described. Additional, fewer, or different operations may be performed depending on the embodiment of flow order determination application 122. The order of presentation of the operations of FIGS. 2 and 3A through 3D is not intended to be limiting. Some of the operations may not be performed in some embodiments. Although some of the operational flows are presented in sequence, the various operations may be performed in various repetitions and/or in other orders than those that are illustrated. Additionally, there are equivalent operations that may be used to achieve the same or similar functionality in alternative embodiments. The provided operations are merely for illustration of the types of processing that can be used to determine the forward and reverse flow lists.

A user may execute flow order determination application 122, which causes presentation of a first user interface window, which may include a plurality of menus and selectors such as drop-down menus, buttons, text boxes, hyperlinks, etc. associated with flow order determination application 122 as understood by a person of skill in the art. The plurality of menus and selectors may be accessed in various orders. An indicator may indicate one or more user selections from a user interface, one or more data entries into a data field of the user interface, one or more data items read from a command line, one or more data items read from computer-readable medium 108, or one or more data items otherwise defined with one or more default values, etc. that are received as an input by flow order determination application 122. Some of the operational flows further may be performed in parallel, for example, using a plurality of threads and/or a plurality of computing devices such as may be included in distributed computing system 128.

Figure 2:
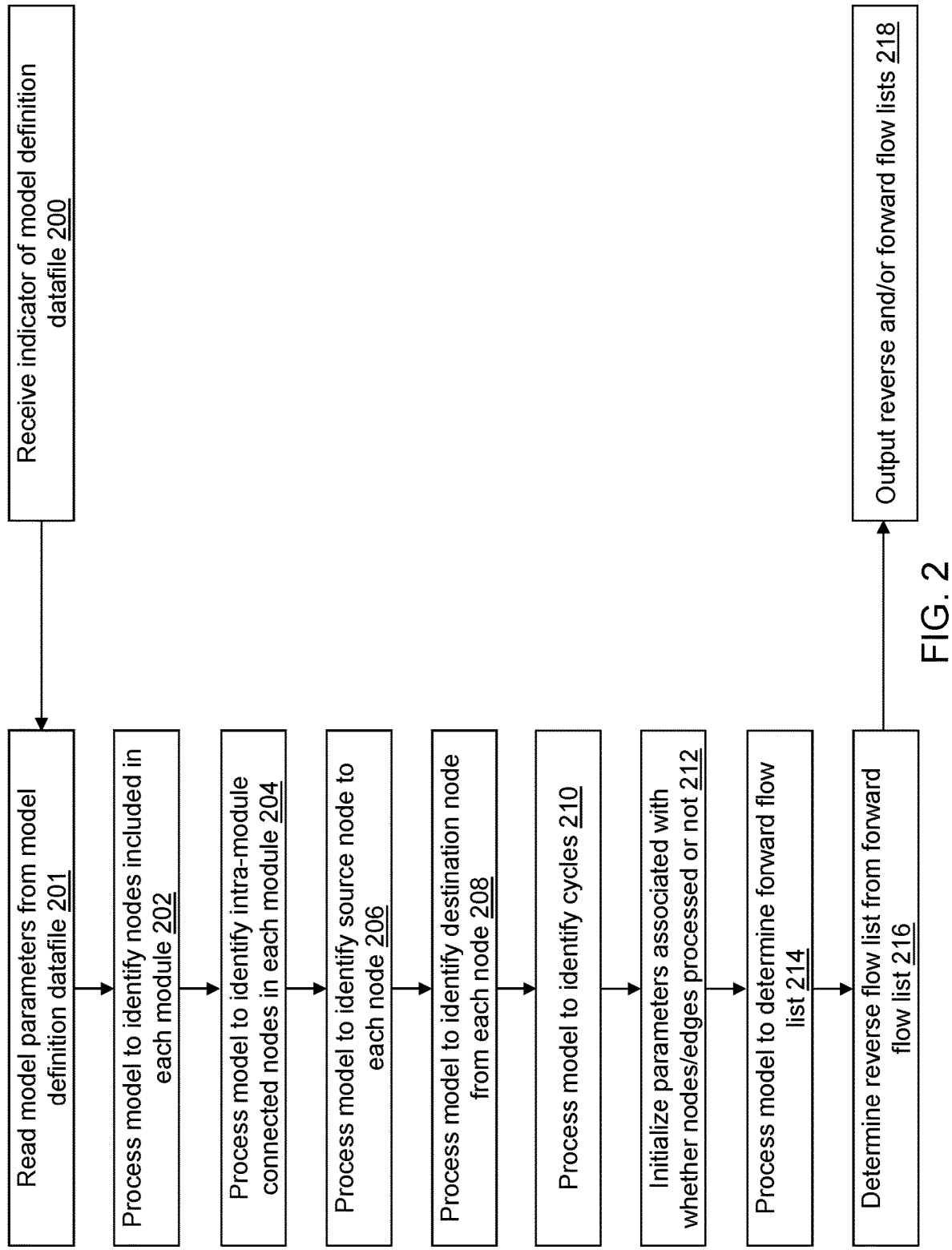

Referring to FIG. 2, in an operation 200, a first indicator may be received that indicates model definition datafile 124. For example, the first indicator indicates a location and a name of model definition datafile 124. As an example, the first indicator may be received by flow order determination application 122 after selection from a user interface window or after entry by a user into a user interface window. In an alternative embodiment, model definition datafile 124 may not be selectable. For example, a most recently created data model may be used automatically.

In an operation 201, model parameters that define the data model are read from model definition datafile 124 unless the model parameters are already stored in-memory.

In an operation 202, the model parameters are processed to identify the nodes and edges included in each module.

In an operation 204, the model parameters are processed to identify the intra-module connected nodes and edges included in each module.

In an operation 206, the model parameters are processed to identify the one or more source nodes of each node and/or one or more source edges of each module.

In an operation 208, the model parameters are processed to identify the one or more destination nodes of each node and/or one or more destination edges of each module.

In an operation 210, the model parameters are processed to identify any cycle in each module and which nodes and/or edges are included in each cycle. An illustrative method for identifying a cycle is described in a paper titled DEPTH-FIRST SEARCH AND LINEAR GRAPH ALGORITHMS by Robert Tarjan published June 1972 in SIAM Journal on Computing at volume 1, number 2, pages 146-160.

For illustration, processing the model parameters may result in defining data structures for use in determining the forward and reverse flow lists such as the classes below. Operations 202 through 210 may be performed separately or concurrently as the in-memory model parameters are processed. For example, as the nodes and edges are identified in each module, the source and destination nodes and edges may be identified in the same or a different processing loop. Similarly, the intra-module connected nodes and/or cycles may be identified in the same or a different processing loop as the nodes and edges are identified.

In general, a list of modules is created for processing with a pointer to a class defined for each module. Within each module class, there is a list of nodes with a pointer to a class defined for each node. Within each node class, there is a list of incoming and outgoing edges with a pointer to a class defined for each edge. An edge class includes a pointer to its source node and to its destination node.

```
Class Module
{
    NODESET nodeset
    NODESET intraNodeset
    Integer intraEdgeCount
}
Class Node
{
    EdgeVector<Edge*> incoming
    EdgeVector<Edge*> outgoing
    EdgeVector<Edge*> intraIncoming
    EdgeVector<Edge*> intraOutgoing
    Integer processedEdgeCount
    Boolean isProcessed
    Boolean isCyclic
    Cycle* cycle
}
Class Edge
{
    Node* sourceNode
    Node* destinationNode
    Boolean isIntraEdge
    Boolean isCyclic
    Boolean isProcessed
}
Class Cycle
{
    NODESET cycleNodes
    EdgeVector nonCyclicIncomingList
    Boolean isProcessed
}
```

For illustration, the NODESET and EdgeVector classes may be those included in the C++ programming language Standard Template Library. The NODESET and EdgeVector classes may be sequence container implementations of dynamic size arrays.

The "nodeset" module class member includes a list of nodes included in the module. For illustration, referring again to FIG. 4, all of the nodes of intermediate module 404 of graph 400 may be included in a list of nodes for intermediate module 404. The "intraNodeset" module class member includes a list of intra-module connected nodes included in the module. For illustration, referring again to FIG. 5, all of the nodes of module subgraph 500 may be included in a list of intra-module connected nodes for the module. The "intraEdgeCount" module class member indicates a total number of edges amongst the intra-module connected nodes included in the module. A value of the "intraEdgeCount" module class member given module subgraph 500 may be eleven.

The "incoming" node class member includes a list of incoming edges to a node. The "outgoing" node class member includes a list of outgoing edges from a node. The "intraIncoming" node class member includes a list of incoming edges to a node that are from an intra-module connected node. For illustration, first intra-module edge 504R4R1 of module subgraph 500 may be included in the "intraIncoming" node class member for first node 502R1. The "intraOutgoing" node class member includes a list of outgoing edges from a node that are to an intra-module connected node. For illustration, first intra-module edge 504R4R1 of module subgraph 500 may be included in the "intraOutgoing" node class member for fourth node 502R4. The "processedEdgeCount" node class member is used to keep track of which intraIncoming and intraOutgoing edges have been processed. The "isProcessed" node class member is used to indicate when the node has been processed. The "isCyclic" node class member is used to indicate when the node is a member of a cycle. For illustration, referring again to FIG. 6, the "isCyclic" node class member may be set to FALSE for fourth node 502R4, but TRUE for second node 502R2. The "cycle" node class member is used to reference a cycle that the node is a member of. For illustration, each of second node 502R2, seventh node 502R7, eighth node 502R8, and fifth node 502R5 include a common pointer to the "cycle" node class member because they are each a member of the same cycle. The "cycleNodes" cycle class member of the "cycle" class to which the "cycle" node class member points includes second node 502R2, seventh node 502R7, eighth node 502R8, and fifth node 502R5.

The "sourceNode" edge class member is used to indicate the source node of the edge. For illustration, fourth node 502R4 of module subgraph 500 may be included in the "sourceNode" edge class member for first intra-module edge 504R4R1. The "destination Node" edge class member is used to indicate the destination node of the edge. For illustration, first node 502R1 may be included in the "destinationNode" edge class member for first intra-module edge 504R4R1. The "isIntraEdge" edge class member is used to indicate when the edge is created between nodes in the same module. For illustration, the "isIntraEdge" edge class member may be set to TRUE for first intra-module edge 504R4R1, but FALSE for first edge 414R1A1 shown referring to FIG. 4. The "isCyclic" edge class member is used to indicate when the edge is a part of a cycle. For illustration, referring again to FIG. 6, the "isCyclic" edge class member may be set to FALSE for first intra-module edge 504R4R1, but TRUE for first edge 414R2R7. The "isProcessed" edge class member is used to indicate when the edge has been processed.

The "cycleNodes" cycle class member includes a list of nodes included in the cycle. The "nonCyclicIncomingList" cycle class member includes a list of non-cycle incoming edges where the source nodes are also non-cycle nodes. For illustration, the "nonCyclicIncomingList" cycle class member for the cycle of FIG. 6 may include fourth intra-module edge 504R1R2, second intra-module edge 504R4R5, and third intra-module edge 504R4R7. The "isProcessed" cycle class member is used to indicate when the cycle has been processed.

Referring again to FIG. 2, in an operation 212, parameters are initialized to indicate whether a node or a cycle has been processed when processing the model parameters to determine the forward and reverse flow lists. For example, the "isProcessed" node class member of each node may be initialized to FALSE; the "isProcessed" edge class member of each edge may be initialized to FALSE; the "isProcessed" cycle class member of each cycle may be initialized to FALSE; and the "processedEdgeCount" node class member of each node may be initialized to zero.

In an operation 214, the model is processed to determine the forward flow list. For example, referring to FIGS. 3A through 3D, example operations to determine the forward flow list are shown.

In an operation 216, the reverse flow list is determined from the forward flow list. The reverse flow list is an inverse of or a reverse of the forward flow list such that the list is processed in the reverse order. Because the reverse flow list is simply processed in reverse order, the reverse flow list need not be stored in memory. Instead, the operations include processing the forward flow list from the end to the beginning of the list instead of from the beginning to the end of the list. Thus, only one flow list, which may be either the forward flow list or the reverse flow list, may be defined with the appropriate iterative processing of the list performed from the end to the beginning of the list instead of from the beginning to the end of the list as described further with respect to FIGS. 9A and 9B.

In the illustrative embodiment of FIG. 2, the forward flow list is determined using the example operations of FIGS. 3A through 3D and the reverse flow list is determined as the inverse of the forward flow list. In an alternative embodiment, the reverse flow list could be determined using similar operations to those described by the example operations of FIGS. 3A through 3D as described further below, and the forward flow list can be determined as the inverse of the reverse flow list. Again, only one flow list may be defined that is either the reverse flow list or the forward list with the iterative processing of the list performed from beginning to end or from end to beginning depending on which type of list is stored and which type of flow processing is performed, reverse or forward, as described further with respect to FIGS. 9A and 9B.

In an operation 218, the forward flow list and/or the reverse flow list are output. For example, the forward flow list and the reverse flow list may be stored in flow order datafile 126 on computer readable medium 108 or another computer readable medium of a computing device of distributed computing system 128 or in-memory on computer readable medium 108.

Figure 3A:
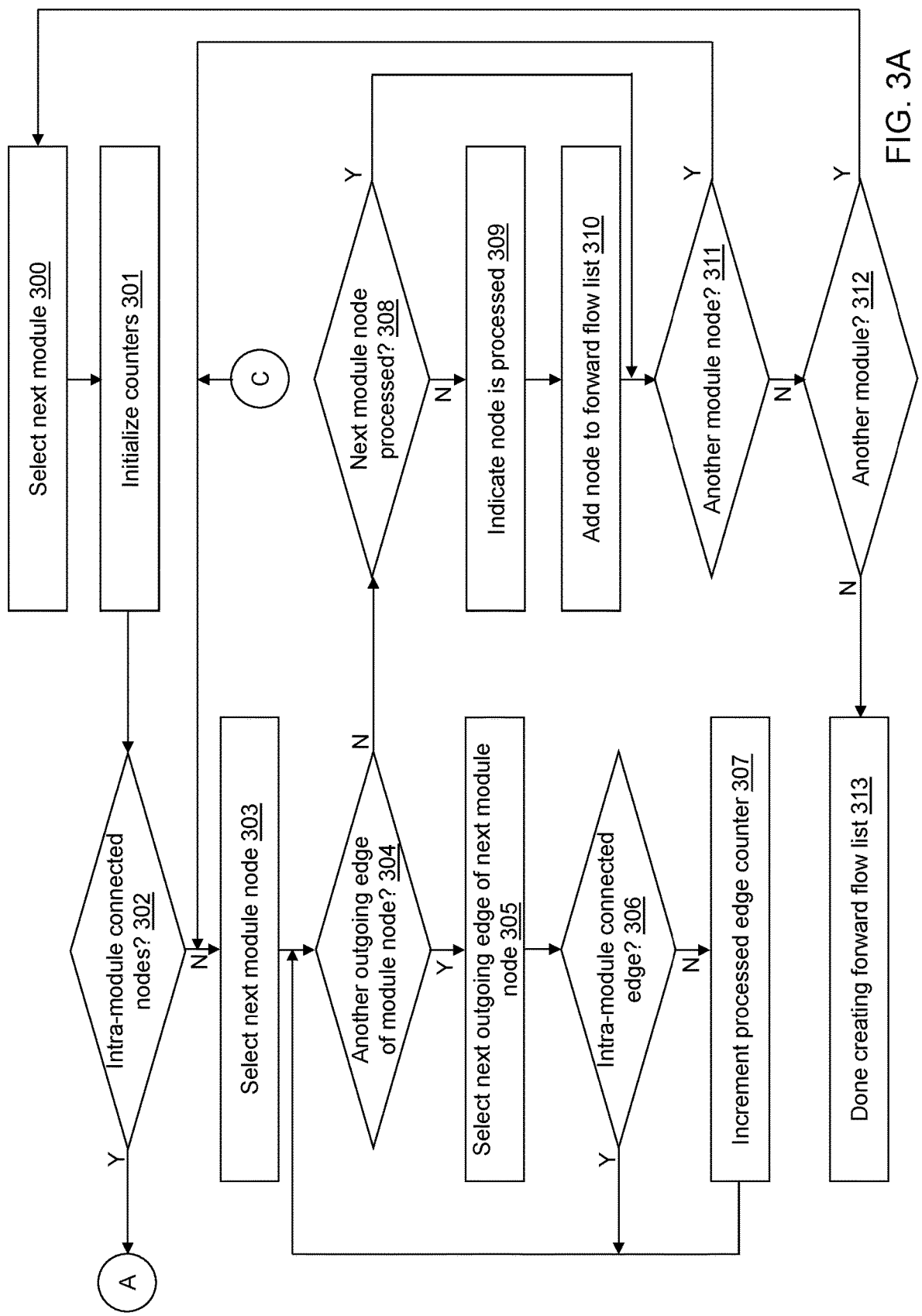

Referring to FIG. 3A, in an operation 300, a next module is selected from a module list created when processing the data model. For example, on a first iteration of operation 300, a first module is selected from the module list; on a second iteration of operation 300, a second module is selected from the module list; and so on until each module in the module list is selected and processed.

In an operation 301, counters are initialized for the module. For example, a number of intra-module edges processed $C_{ie}$ may be initialized to zero using $C_{ie}=0$.

In an operation 302, a determination is made concerning whether the selected module includes intra-module connected nodes. When the selected module includes intra-module connected nodes, processing continues in an operation 320 shown referring to FIG. 3B. When the selected module does not include intra-module connected nodes, processing continues in an operation 303. For example, the "intraNodeset" module class member that includes a list of intra-module connected nodes included in the module may be empty indicating that the module does not include any intra-module connected nodes.

In operation 303, a next module node is selected from the list of module nodes associated with the selected module. For example, on a first iteration of operation 303, a first node is selected from the list of module nodes; on a second iteration of operation 303, a second node is selected from the list of module nodes; and so on until each node in the list of module nodes is selected and processed. For illustration, the "nodeset" module class member includes a list of module nodes.

In an operation 304, a determination is made concerning whether there is another outgoing edge of the selected next module node to select and process. For example, the "outgoing" node class member includes a list of outgoing edges from the module node. When there is another outgoing edge to select and process, processing continues in an operation 305. When there is not another outgoing edge to select and process, processing continues in an operation 308. In some cases, the list of outgoing edges from the module node may be empty.

In operation 305, a next outgoing edge is selected from the list of outgoing edges. For example, on a first iteration of operation 305, a first edge is selected from the list of outgoing edges; on a second iteration of operation 305, a second edge is selected from the list of outgoing edges; and so on until each outgoing edge in the list of outgoing edges is selected and processed.

In an operation 306, a determination is made concerning whether the selected next outgoing edge is between two intra-module connected nodes. For example, the "isIntraEdge" edge class member being set to TRUE may be used to indicate that the selected next outgoing edge is between two intra-module connected nodes. When the selected next outgoing edge is between two intra-module connected nodes, processing continues in operation 304 to skip the selected next outgoing edge. When the selected next outgoing edge is not between two intra-module connected nodes, processing continues in an operation 307.

In operation 307, a processed edge counter is incremented for edges not connected between two intra-module connected nodes, and processing continues in operation 304. For example, a counter such as the "processedEdgeCount" node class member is incremented. For illustration, a pointer from the selected next outgoing edge to its destination node and its "processedEdgeCount" node class member may be used and incremented such as using *edge→destinationNode→processedEdgeCount++, where *edge indicates the selected next outgoing edge. The *edge→destinationNode→processedEdgeCount class member is updated to know whether all of the incoming edges are processed or not for the destination node of the respective edge.

In operation 308, a determination is made concerning whether the selected next module node has been processed. For example, the "isProcessed" node class member being set to TRUE may be used to indicate that the selected next module node has been processed. When the selected next module node has been processed, processing continues in an operation 311. When the selected next module node has not been processed, processing continues in an operation 309.

In operation 309, the "isProcessed" node class member of the selected next module node may be set to TRUE to indicate that the selected next module node been processed.

In an operation 310, the selected next module node may be added to the forward flow list. For example, a pointer to the selected next module node may be added to the list or other information that identifies the selected next module node from the other nodes of the data model.

In operation 311, a determination is made concerning whether there is another module node included in the list of module nodes associated with the selected module. When there is another module node of the selected next module, processing continues in operation 303 to select and process the next module node. When there is not another module node of the selected next module, processing continues in an operation 312. Operations 303 through 311 process nodes of the selected module that are not intra-module connected nodes after processing any intra-module connected nodes.

In operation 312, a determination is made concerning whether there is another module included in the list of modules included in the data model. When there is another module, processing continues in operation 300 to select and process the next module. When there is not another module, processing continues in an operation 313.

In operation 313, the forward flow list has been created by processing all of the modules of the data model, and processing can continue in operation 216 of FIG. 2 to create the reverse flow list.

Figure 3B:
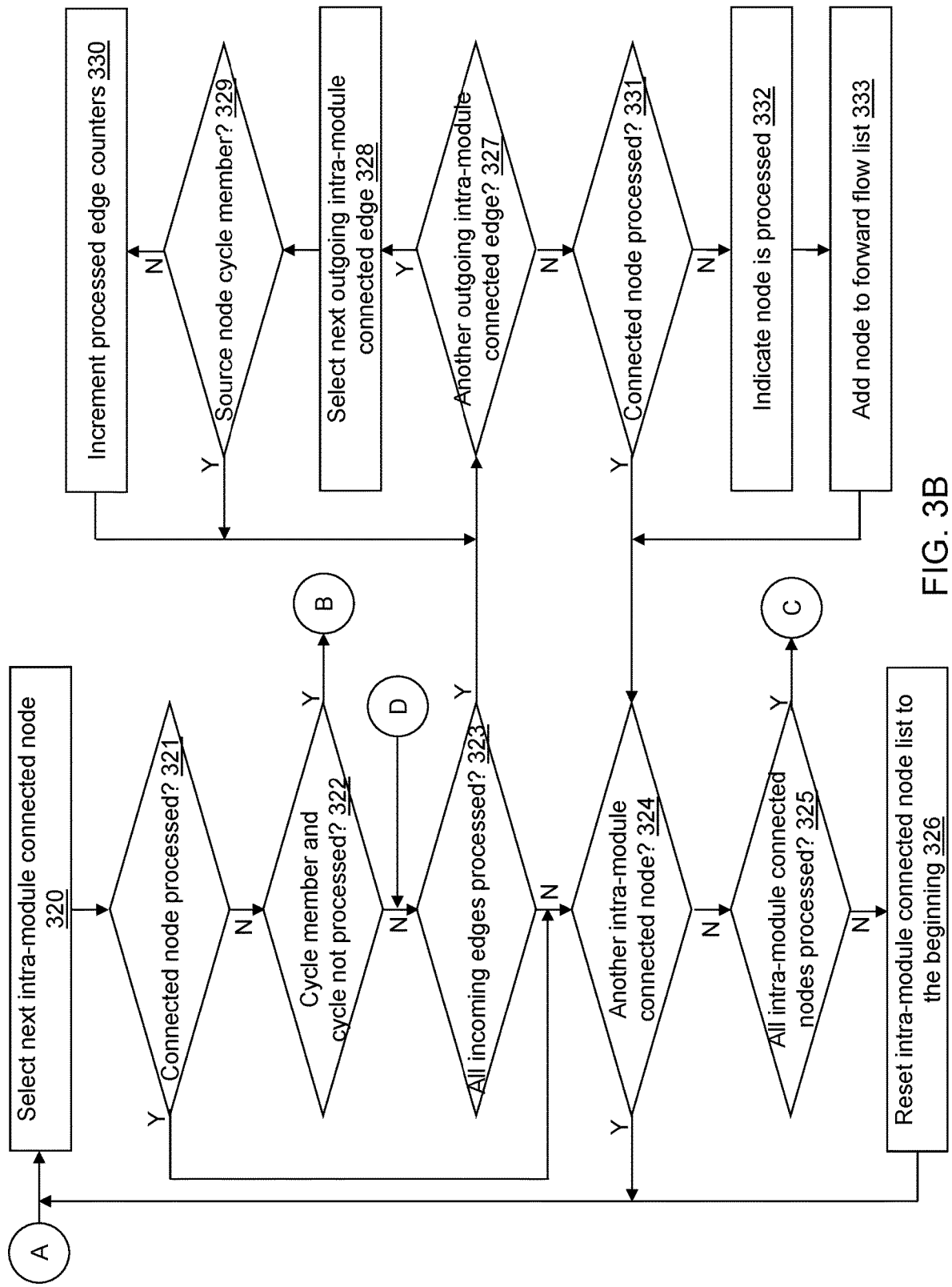

Referring to FIG. 3B, in operation 320, a next intra-module connected node is selected from the list of intra-module connected nodes associated with the selected module. For example, on a first iteration of operation 320, a first node is selected from the list of intra-module connected nodes; on a second iteration of operation 320, a second node is selected from the list of intra-module connected nodes; and so on until each node in the list of outgoing edges is selected and processed. For example, the "intraNodeset" module class member includes a list of intra-module connected nodes included in the module.

In an operation 321, a determination is made concerning whether the selected next intra-module connected node has been processed. For example, the "isProcessed" node class member being set to TRUE may be used to indicate that the selected next intra-module connected node has been processed. When the selected next intra-module connected node has been processed, processing continues in an operation 324. When the selected next intra-module connected node has not been processed, processing continues in an operation 322.

In operation 322, a determination is made concerning whether the selected next intra-module connected node is a cycle member and when the selected next intra-module connected node is a cycle member whether it has been processed. For example, the "isCyclic" node class member being set to TRUE may be used to indicate that the selected next intra-module connected node is a cycle member. The "isProcessed" cycle class member of the "cycle" node class member being set to TRUE may be used to indicate that the cycle has been processed. When the selected next intra-module connected node is a cycle member and the cycle member has not been processed, processing continues in an operation 340 shown referring to FIG. 3C to process the cycle. Otherwise, processing continues in an operation 323 to process the non-cycle intra-module connected nodes.

In operation 323, a determination is made concerning whether all of the incoming edges of the selected next intra-module connected node have been processed. For example, a comparison between a number of incoming edges to the node with a value of the "processedEdgeCount" node class member may be used to indicate whether all of the incoming edges of the selected next intra-module connected node have been processed. For example, when *node→intraIncoming.size is greater than *node→processedEdgeCount all of the incoming edges of the selected next intra-module connected node have not been processed. When all of the incoming edges of the selected next intra-module connected node have been processed, processing continues in operation 327. When all of the incoming edges of the selected next intra-module connected node have not been processed, processing continues in an operation 324 to process the next intra-module connected node.

In operation 324, a determination is made concerning whether there is another intra-module connected node included in the list of intra-module connected nodes associated with the selected module to select and process. When there is another intra-module connected node to select and process, processing continues in operation 320 to continue processing with a next node in the list. When there is not another intra-module connected node to select and process, processing continues in an operation 325.

In operation 325, a determination is made concerning whether all of the intra-module connected nodes associated with the selected module have been processed. When all of the intra-module connected nodes have been processed, processing continues in operation 303 shown referring to FIG. 3A to process the non-intra-module connected nodes. When all of the intra-module connected nodes have not been processed, processing continues in an operation 326. For example, when N<*module→intraNodeset. size AND when $C_{ie} \geq$*module→intraEdgeCount, all of the intra-module connected nodes of the module have been processed. The intraNodeset. size class member that indicates the number of intra-module connected nodes, intraNodeset. size, may be different from the number of intra-module connected edges, intraEdgeCount. For example, module subgraph 500 represented in FIG. 5 includes eight intra-module connected nodes connected by eleven intra-module connected edges. N may be initialized to zero prior to operation 320.

In operation 326, the list of intra-module connected nodes associated with the selected module is reset to the beginning to select a first node in the list on a next selection in operation 320, and N may be incremented, for example, using N=N+1, and processing continues in operation 320 to loop through the set of connected nodes again.

In operation 327, a determination is made concerning whether there is another outgoing edge of the selected next intra-module connected node to select and process. For example, the "intraOutgoing" node class member includes a list of outgoing edges from the selected next intra-module connected node that are to an intra-module connected node. When there is another outgoing edge to select and process, processing continues in an operation 328. When there is not another outgoing edge to select and process, processing continues in an operation 331.

In operation 328, a next outgoing intra-module connected edge is selected from the list of outgoing edges from the selected next intra-module connected node that are to an intra-module connected node. For example, on a first iteration of operation 328, a first edge is selected from the list of outgoing edges; on a second iteration of operation 328, a second edge is selected from the list of outgoing edges; and so on until each outgoing edge in the list of outgoing edges is selected and processed. In some cases, the list of outgoing edges may be empty.

In an operation 329, a determination is made concerning whether the selected edge is from a cycle member. For example, the edge→sourceNode→isCyclic node class member being set to TRUE may be used to indicate that the selected edge is from a cycle member. When the selected edge is from a cycle member, processing continues in operation 327 to skip the selected edge. When the selected edge is not from a cycle member, processing continues in an operation 330.

In operation 330, processed edge counters are incremented, and processing continues in operation 327. For example, $C_{ie}$ is incremented using $C_{ie}=C_{ie}+1$, and a pointer from the selected edge to the destination node and its "processedEdgeCount" node class member may be incremented, for example, using *edge→destinationNode→processedEdgeCount++, where *edge indicates the edge selected in operation 328.

In operation 331, a determination is made concerning whether the selected next intra-module connected node has been processed. For example, the "isProcessed" node class member being set to TRUE may be used to indicate that the selected next intra-module connected node has been processed. When the selected next intra-module connected node has been processed, processing continues in operation 324. When the selected next intra-module connected node has not been processed, processing continues in an operation 332.

Similar to operation 309, in operation 332, the "isProcessed" node class member of the selected next intra-module connected node may be set to TRUE to indicate the selected next intra-module connected node been processed.

Similar to operation 310, in an operation 333, the selected next intra-module connected node is added to the forward flow list. The operations of FIG. 3B describe processing of intra-module connected nodes that are not a cycle member that has not been processed.

Figure 3C:
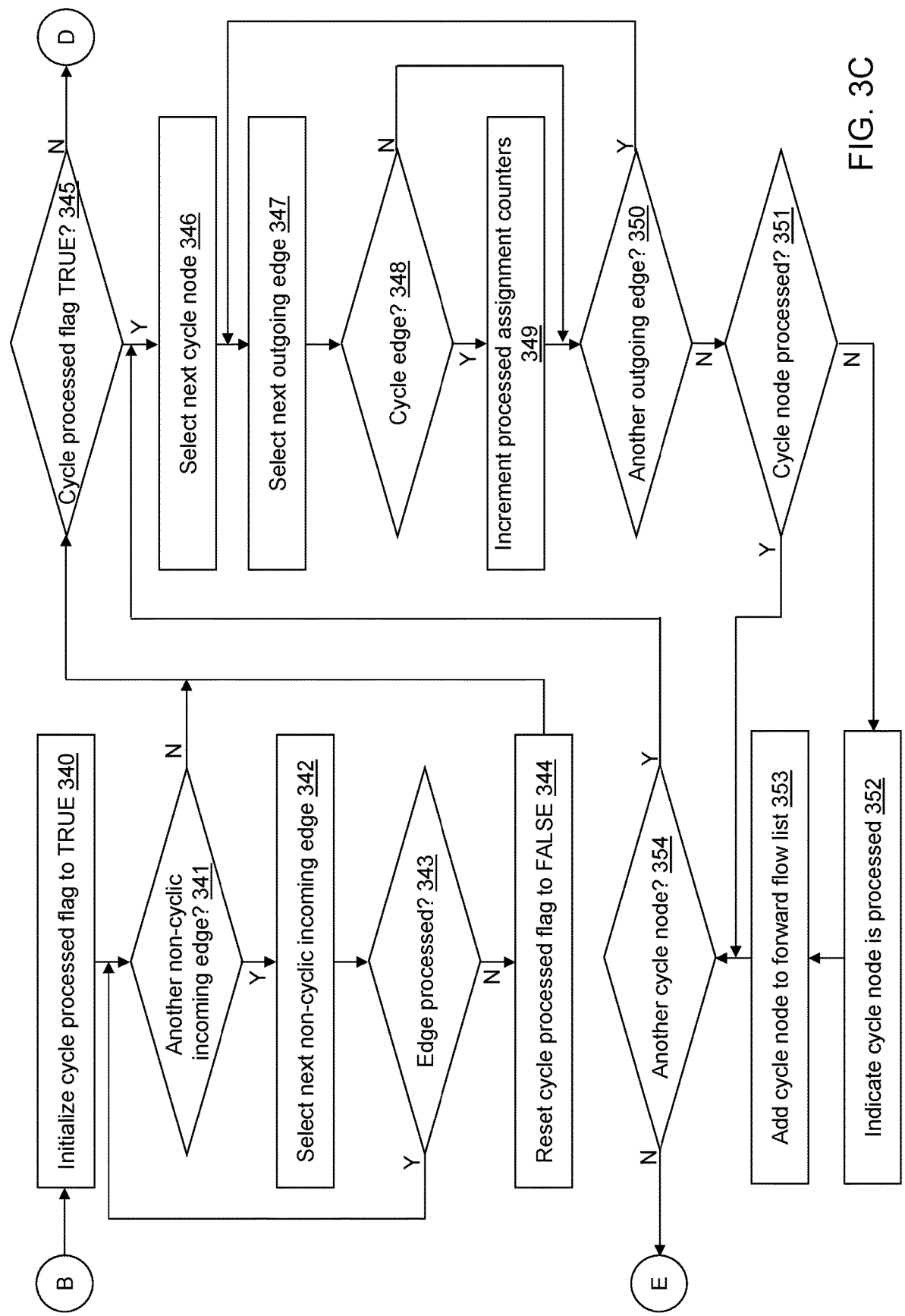

Referring to FIG. 3C, in operation 340, a cycle processed flag is initialized, for example, to TRUE.

In an operation 341, a determination is made concerning whether there is another non-cyclic incoming edge to select and process. For example, the "nonCyclicIncomingList" cycle class member includes a list of non-cyclic incoming edges. When there is another non-cyclic incoming edge to select and process, processing continues in an operation 342. When there is not another non-cyclic incoming edge to select and process, processing continues in an operation 345.

In operation 342, a next non-cyclic incoming edge is selected from the list of non-cyclic incoming edges. For example, on a first iteration of operation 342, a first incoming edge is selected from the list of non-cyclic incoming edges; on a second iteration of operation 342, a second incoming edge is selected from the list of non-cyclic incoming edges; and so on until each non-cyclic incoming edge in the list of non-cyclic incoming edges is selected and processed. The list of non-cyclic incoming edges may be empty.

In operation 343, a determination is made concerning whether the selected next non-cyclic incoming edge has been processed. For example, the "isProcessed" edge class member being set to TRUE may be used to indicate that the edge has been processed. When the edge has been processed, processing continues in operation 341. When the edge has not been processed, processing continues in an operation 344.

In operation 344, the cycle processed flag may be reset, for example, to FALSE, and processing continues in operation 345.

In operation 345, a determination is made concerning whether the cycle processed flag is TRUE or FALSE. When the cycle processed flag is TRUE, processing continues in an operation 346. When the cycle processed flag is FALSE, processing continues in operation 323 shown referring to FIG. 3B to process the non-cyclic nodes.

In operation 346, a next cycle node is selected from the list of nodes included in the cycle. For illustration, the "cycleNodes" cycle class member includes a list of nodes included in the cycle. For example, on a first iteration of operation 346, a first node is selected from the list of cycle nodes; on a second iteration of operation 346, a second node is selected from the list of cycle nodes; and so on until each cycle node in the list of cycle nodes is selected and processed.

In an operation 347, a next outgoing edge is selected from the list of outgoing edges from the selected next cycle node. For example, on a first iteration of operation 347, a first edge is selected from the list of outgoing edges; on a second iteration of operation 347, a second edge is selected from the list of outgoing edges; and so on until each outgoing edge in the list of outgoing edges is selected and processed. In some cases, the list of outgoing edges may be empty.

In an operation 348, a determination is made concerning whether the next outgoing intra edge is to a cycle member. For example, the "isCyclic" edge class member being set to TRUE may be used to indicate that the next outgoing edge is to a cycle member. When the selected next outgoing edge is to a cycle member, processing continues in an operation 349. When the selected next outgoing edge is not to a cycle member, processing continues in an operation 350.

Similar to operation 330, in operation 349, the processed edge counters are incremented. For example, $C_{ie}$ is incremented and *edge→destinationNode→processedEdgeCount++, where *edge indicates the edge selected in operation 347.

In operation 350, a determination is made concerning whether there is another outgoing edge of the selected next cycle node to select and process. For example, the "intraOutgoing" node class member includes a list of outgoing edges from the selected next cycle node that are to another outgoing edge. When there is another outgoing edge to select and process, processing continues in operation 347. When there is not another outgoing edge to select and process, processing continues in an operation 351.

In operation 351, a determination is made concerning whether the selected next cycle node has been processed. For example, the "isProcessed" node class member being set to TRUE may be used to indicate that the selected next cycle node has been processed. When the selected next cycle node has been processed, processing continues in an operation 354. When the selected next cycle node has not been processed, processing continues in an operation 352.

Similar to operation 309, in operation 352, the "isProcessed" node class member of the selected next cycle node may be set to TRUE to indicate the selected next intra cycle node been processed.

Similar to operation 310, in an operation 353, the selected next cycle node is added to the forward flow list.

In operation 354, a determination is made concerning whether there is another cycle node to select and process. When there is another cycle node to select and process, processing continues in operation 346. When there is not another cycle node to select and process, processing continues in an operation 360 shown referring to FIG. 3D. The operations of FIG. 3C describe processing for edges connected within a cycle.

Referring to FIG. 3D, similar to operation 346, in operation 360, a next cycle node is selected from the list of nodes included in the cycle. For example, on a first iteration of operation 360, a first node is selected from the list of cycle nodes; on a second iteration of operation 360, a second node is selected from the list of cycle nodes; and so on until each cycle node in the list of cycle nodes is selected and processed.

Similar to operation 347, in operation 361, a next outgoing edge is selected from the list of outgoing edges from the selected next cycle node.

Similar to operation 348, in an operation 362, a determination is made concerning whether the next outgoing edge is to a cycle member. When the selected next outgoing edge is to a cycle member, processing continues in an operation 364. When the selected next outgoing edge is not to a cycle member, processing continues in an operation 363.

Similar to operation 330, in operation 363, processed edge counters are incremented. For example, $C_{ie}$ is incremented and *edge→destinationNode→processedEdgeCount++, where *edge indicates the edge selected in operation 361.

Similar to operation 350, in an operation 364, a determination is made concerning whether there is another outgoing edge of the selected next cycle node to select and process. When there is another outgoing edge to select and process, processing continues in operation 361. When there is not another outgoing edge to select and process, processing continues in an operation 365.

Similar to operation 351, in operation 365, a determination is made concerning whether the selected next cycle node has been processed. For example, the "isProcessed" node class member being set to TRUE may be used to indicate that the selected next cycle node has been processed. When the selected next cycle node has been processed, processing continues in an operation 368. When the selected next cycle node has not been processed, processing continues in an operation 366.

Similar to operation 352, in operation 366, the "isProcessed" node class member of the selected next cycle node may be set to TRUE to indicate the selected next cycle node been processed.

Similar to operation 353, in an operation 367, the selected next cycle node is added to the forward flow list.

Similar to operation 354, in operation 368, a determination is made concerning whether there is another cycle node to select and process. When there is another cycle node to select and process, processing continues in operation 360. When there is not another cycle node to select and process, processing continues in operation 323 shown referring to FIG. 3B. The operations of FIG. 3D describe processing for edges not connected within a cycle.

In the illustrative embodiment of FIGS. 3A through 3D, the forward flow list is determined. In an alternative embodiment, the reverse flow list could be determined using similar operations to those described by the example operations of FIGS. 3A through 3D, and, if desired, the forward flow list can be determined as the inverse of the reverse flow list. For example, the similar operations may include iterating the nodes from the last module to the first module instead of the first module to the last module as described by the example operations of FIGS. 3A through 3D. Additionally, instead of processing incoming edges first, outgoing edges may be processed first, and destination nodes may be used instead of source nodes as described by the example operations of FIGS. 3A through 3D. Further, the non-cyclic outgoing edges may be processed first before processing a cycle instead of incoming edges as described by the example operations of FIGS. 3A through 3D. Still further, a nodes incoming edges may be iterated instead of the outgoing edges as described by the example operations of FIGS. 3A through 3D to create the reverse flow list.

Figure 8:
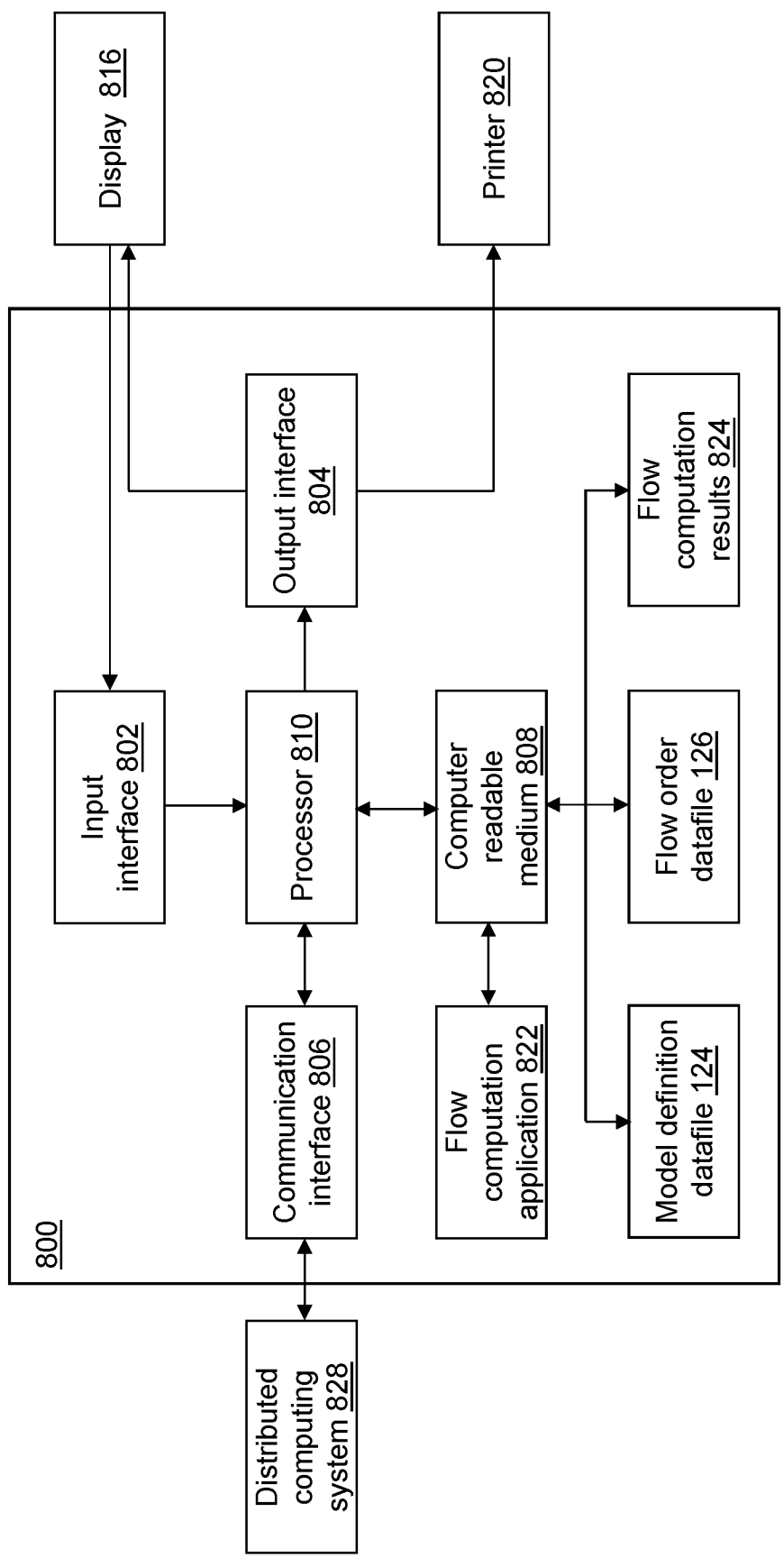
FIG. 8 depicts a block diagram of a flow computation device in accordance with an illustrative embodiment.

Referring to FIG. 8, a block diagram of a flow computation device 800 is shown in accordance with an illustrative embodiment. Flow computation device 800 may include a second input interface 802, a second output interface 804, a second communication interface 806, a second non-transitory computer-readable medium 808, a second processor 810, flow computation application 822, model definition datafile 124, flow order datafile 126, and flow computation results 824. Fewer, different, and/or additional components may be incorporated into flow computation device 800.

Flow computation device 800 and flow order determination device 100 may be the same or different devices.

Second input interface 802 provides the same or similar functionality as that described with reference to input interface 102 of flow order determination device 100 though referring to flow computation device 800. Second output interface 804 provides the same or similar functionality as that described with reference to output interface 104 of flow order determination device 100 though referring to flow computation device 800. Second communication interface 806 provides the same or similar functionality as that described with reference to communication interface 106 of flow order determination device 100 though referring to flow computation device 800. Data and messages may be transferred between flow computation device 800 and a distributed computing system 828 using second communication interface 806. Distributed computing system 128 and distributed computing system 828 may be the same or different computing systems. Second computer-readable medium 808 provides the same or similar functionality as that described with reference to computer-readable medium 108 of flow order determination device 100 though referring to flow computation device 800. Second processor 810 provides the same or similar functionality as that described with reference to processor 110 of flow order determination device 100 though referring to flow computation device 800.

Flow computation application 822 performs operations associated with using the data model stored in model definition datafile 124 and the reverse and/or forward flow lists stored in flow order datafile 126 to compute the computational parameter values for the data model that are stored in flow computation results 824. or all of the operations described herein may be embodied in flow computation application 822. The operations may be implemented using hardware, firmware, software, or any combination of these methods.

Referring to the example embodiment of FIG. 8, flow computation application 822 is implemented in software (comprised of computer-readable and/or computer-executable instructions) stored in second computer-readable medium 808 and accessible by second processor 810 for execution of the instructions that embody the operations of flow computation application 822. Flow computation application 822 may be written using one or more programming languages, assembly languages, scripting languages, etc. Similar to flow order determination application 122, flow computation application 822 may be integrated with other analytic tools. Flow computation application 822 and flow order determination application 122 may be the same or different applications that are integrated in various manners to generate flow model computations. Flow computation application 822 may be implemented as a Web application.

Figure 9A:
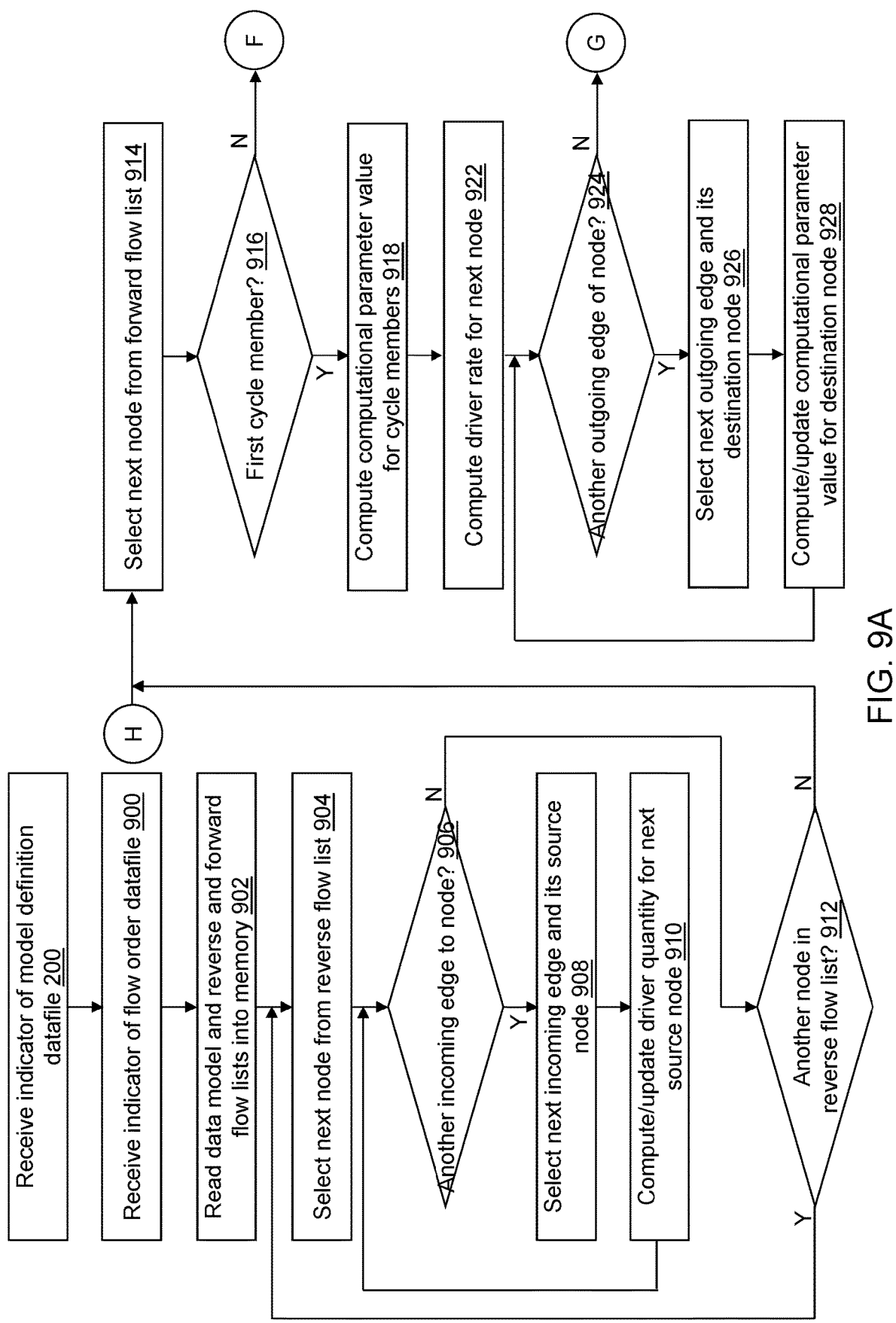
FIGS. 9A and 9B depict a flow diagram illustrating examples of operations performed by a flow computation application of the flow computation device of FIG. 8 in accordance with an illustrative embodiment.
Figure 9B:
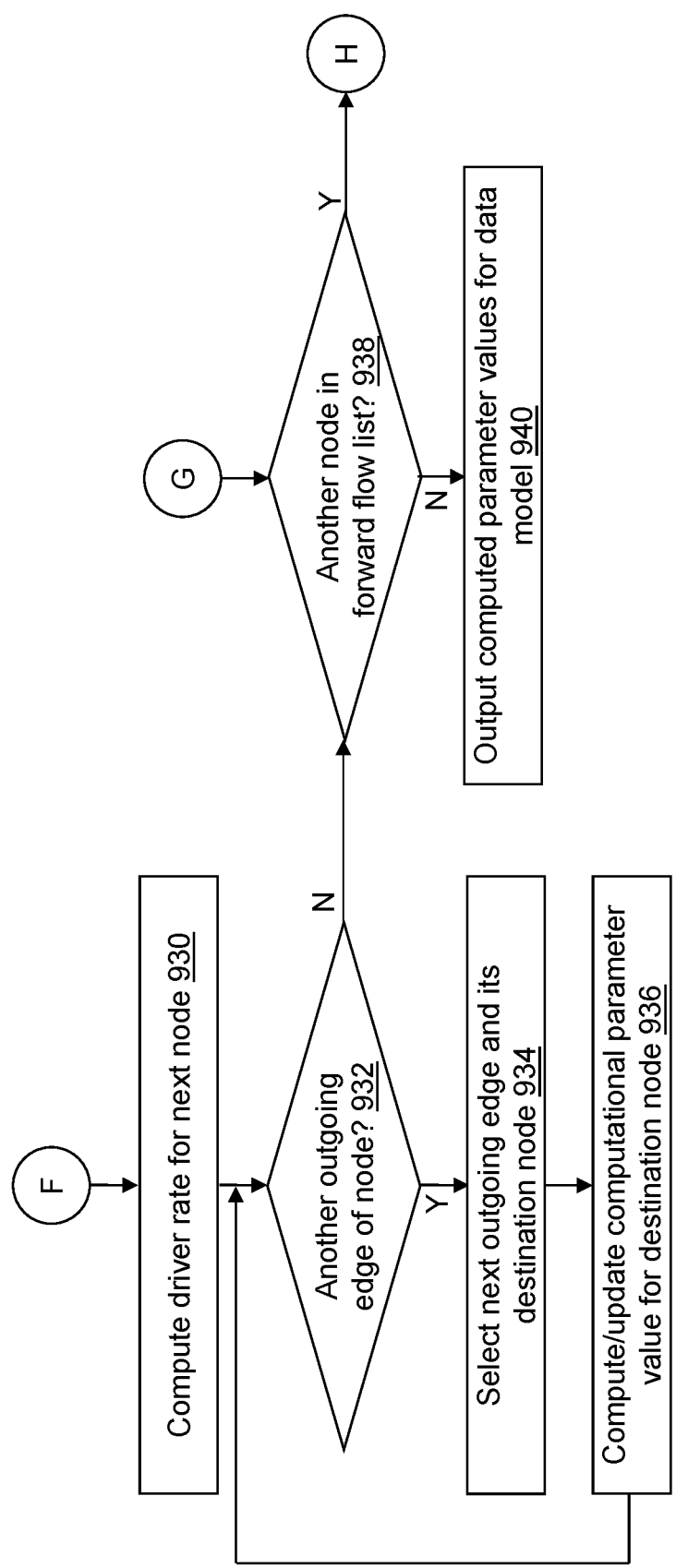

Referring to FIGS. 9A and 9B, example operations of flow computation application 822 are described. Additional, fewer, or different operations may be performed depending on the embodiment of flow computation application 822. The order of presentation of the operations of FIGS. 9A and 9B is not intended to be limiting. Although some of the operational flows are presented in sequence, the various operations may be performed in various repetitions and/or in other orders than those that are illustrated.

Referring to FIG. 9A, in operation 200, the first indicator may be received that indicates model definition datafile 124. In an alternative embodiment, the first indicator may have already been received as part of integration between flow order determination application 122 and flow computation application 822.

In an operation 900, a second indicator may be received that indicates flow order datafile 126. For example, the second indicator indicates a location and a name of flow order datafile 126. As an example, the second indicator may be received by flow computation application 822 after selection from a user interface window or after entry by a user into a user interface window. In an alternative embodiment, flow order datafile 126 may not be selectable. For example, the most recently created reverse and/or forward flow lists may be used automatically and may already be stored in-memory.

In an operation 902, model parameters that define the data model are read from model definition datafile 124 unless the data model is already stored in-memory, and the reverse and/or forward flow lists that define the computation orders for the data model are read from flow order datafile 126 unless the reverse and/or forward flow lists are already stored in-memory. Though not described herein, one or more of operations 202 through 210 may be performed to load data structures used to perform the computations of FIGS. 9A and 9B.

In an operation 904, a next node is selected from the reverse flow list. In an illustrative embodiment, the reverse flow list is processed first to define quantities for each source node. For example, on a first iteration of operation 904, a first node is selected from the reverse flow list; on a second iteration of operation 904, a second node is selected from the reverse flow list; and so on until each node in the reverse flow list is selected and processed. In an alternative embodiment, the reverse flow list may not be stored separately in-memory. Instead, the forward flow list may be processed in reverse order from the end to the beginning to select the next node.

In an operation 906, a determination is made concerning whether there is another source node of the selected next node that has not been selected and processed. For example, the "incoming" node class member includes a list of incoming edges to a node. When there is another incoming edge to a source node of the selected next node that has not been selected and processed, processing continues in an operation 908. When there is not another incoming edge to a source node of the selected next node that has not been selected and processed, processing continues in an operation 912.

In operation 908, a next incoming edge and its associated source node is selected using the "sourceNode" edge class member of the next incoming edge selected from the list of incoming edges. For example, on a first iteration of operation 908, a first edge is selected from the list of incoming edges; on a second iteration of operation 908, a second edge is selected from the list of incoming edges; and so on until each edge in the list of incoming edges is selected and processed. In some cases, the list of incoming edges may be empty so processing continues in operation 912.

In an operation 910, a driver quantity $d_q$ is computed or updated for the selected source node based on the driver associated with the selected source node, and processing continues in operation 906. For example, if this is the first time while processing the reverse flow list that the selected source node has been selected, the driver quantity is computed based on the driver associated with the source node; otherwise, the driver quantity is computed and added to the previously stored value. The driver quantity $d_q$ value is stored in association with the selected source node.

The type of driver with any associated parameters that have been user defined or defined using default values are included as part of the model data read from model definition datafile 124 unless the data model is already stored in-memory. For example, the CPM User's Guide describes four types of drivers that distribute the computational parameter from a source node to one or more destination nodes. For illustration, the computational parameter can be distributed evenly between the one or more destination nodes, can be distributed based on a predefined percentage value defined for each destination node of the one or more destination nodes, or can be distributed based on a predefined formula that is predefined by the user or in the software.

In operation 912, a determination is made concerning whether there is another node in the reverse flow list (or the forward flow list if the forward flow list is processed in reverse order instead of storing the reverse flow list separately) that has not been selected and processed. When there is another node in the reverse flow list that has not been selected and processed, processing continues in operation 904. When there is not another node in the reverse flow list that has not been selected and processed, processing continues in an operation 914 to process the forward flow list.

In operation 914, a next node is selected from the forward flow list. In an illustrative embodiment, the forward flow list is processed second to define computational parameter values based on the driver quantities computed from processing of the reverse flow list. For example, on a first iteration of operation 914, a first node is selected from the forward flow list; on a second iteration of operation 914, a second node is selected from the forward flow list; and so on until each node in the forward flow list is selected and processed. In an alternative embodiment, the forward flow list may not be stored separately in-memory. Instead, the reverse flow list may be processed in reverse order from the end to the beginning to select the next node.

In operation 916, a determination is made concerning whether the selected next node is a first member of a cycle. For example, the "isCyclic" node class member being set to TRUE may be used to indicate that the selected next node is a cycle member. When the selected next node is a first member of a cycle, processing continues in an operation 918. When the selected next node is not a first member of a cycle, processing continues in an operation 928 shown referring to FIG. 9B.

In an operation 918, a computational parameter value is computed for each cycle member using Ax=b, where A=I−P, A is a square matrix having a dimension of d×d, d is a number of cycle members, I is a diagonal square matrix having a dimension of d×d, P is a square matrix having a dimension of d×d with respective driver quantity values between pairs of the cycle members in each matrix location, x is a vector of the computational parameter values for the cycle members, and b is a vector of input computational parameter values for the cycle members one or more of which may be zero. The computational parameter value computed for each cycle member may be referred to as a reciprocal value.

Figure 7:
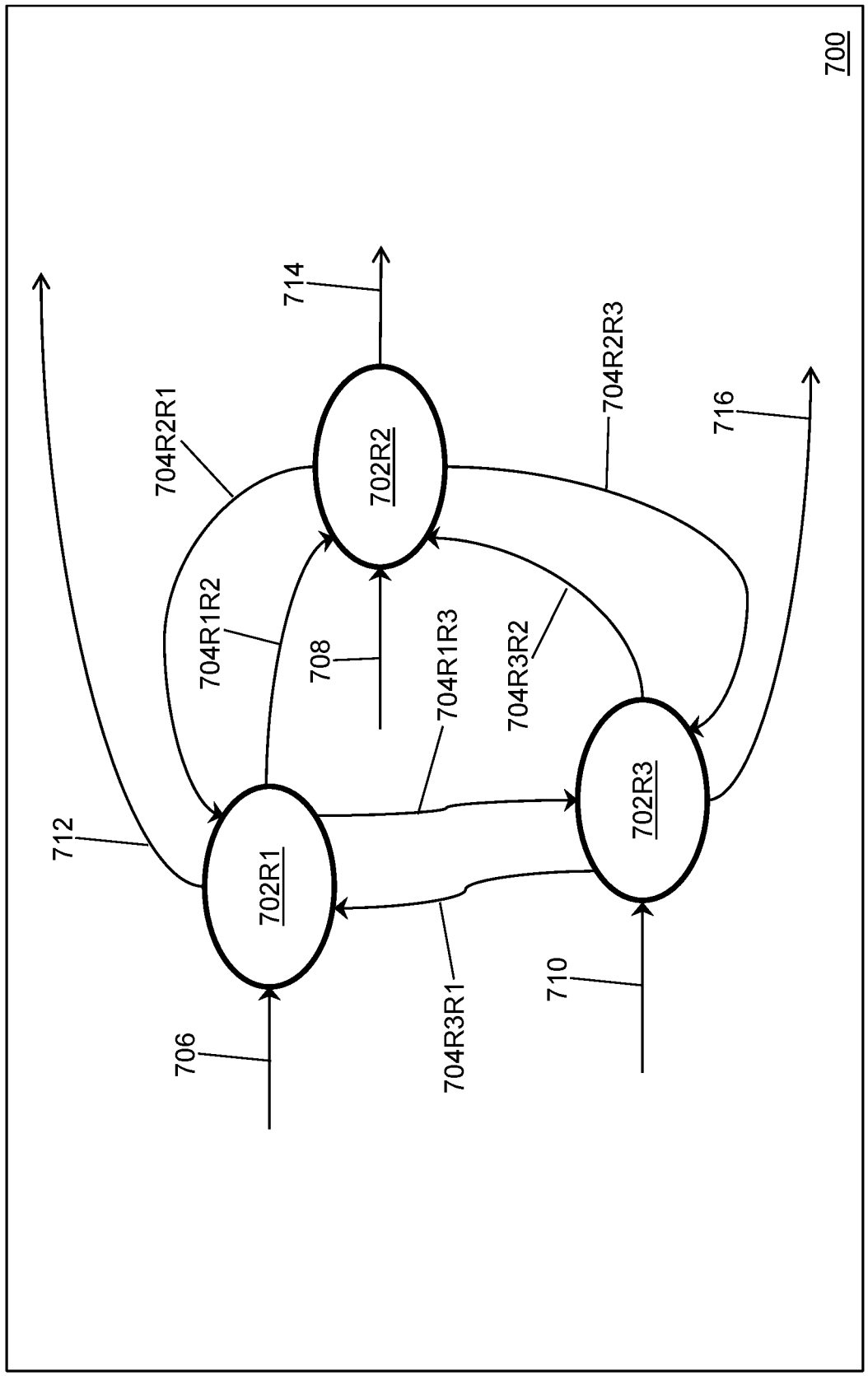
FIG. 7 shows a cycle of a data model in accordance with an illustrative embodiment.

For illustration, referring to FIG. 7, a cycle 700 is shown in accordance with an illustrative embodiment. Cycle 700 includes a first cycle node 702R1, a second cycle node 702R2, and a third cycle node 702R3. First cycle node 702R1 is connected as a source to second cycle node 702R2 through a first cycle edge 704R1R2 and to third cycle node 702R3 through a second cycle edge 704R1R3. Second cycle node 702R2 is connected as a source to first cycle node 702R1 through a third cycle edge 704R2R1 and to third cycle node 702R3 through a fourth cycle edge 704R2R3. Third cycle node 702R3 is connected as a source to first cycle node 702R1 through a fifth cycle edge 704R3R1 and to second cycle node 702R2 through a sixth cycle edge 704R3R2.

A first input computational parameter value is indicated by a first input 706 to first cycle node 702R1; a second input computational parameter value is indicated by a second input 708 to second cycle node 702R2; and a third input computational parameter value is indicated by a third input 710 to third cycle node 702R3. A first output computational parameter value is indicated by a first output 712 from first cycle node 702R1; a second output computational parameter value is indicated by a second output 714 from second cycle node 702R2; and a third output computational parameter value is indicated by a third output 716 from third cycle node 702R3.

The first input computational parameter value, the second input computational parameter value, and the third input computational parameter value may be received from other source nodes of the data model either in the same or a preceding module. The first output computational parameter value, the second output computational parameter value, and the third output computational parameter value may be sent to other destination nodes of the data model either in the same or a succeeding module.

Assuming the first input computational parameter value is 1000, the second input computational parameter value is 500, and the third input computational parameter value is 200, $$b = \begin{bmatrix} 1000 \\ 500 \\ 200 \end{bmatrix}.$$

$$P = \begin{bmatrix} R1 \to R1 & R2 \to R1 & R3 \to R1 \\ R1 \to R2 & R2 \to R2 & R3 \to R2 \\ R1 \to R3 & R2 \to R3 & R3 \to R3 \end{bmatrix}$$

based on the three cycle members. Assuming the driver quantity associated with first cycle edge 704R1R2 is 5%, the driver quantity associated with third cycle edge 704R2R1 is 7%, the driver quantity associated with fifth cycle edge 704R3R1 is 10%, the driver quantity associated with second cycle edge 704R1R3 is 1%, the driver quantity associated with fourth cycle edge 704R2R3 is 2%, the driver quantity associated with sixth cycle edge 704R3R2 is 3%, $$P = \begin{bmatrix} 0 & 0.07 & 0.1 \\ 0.05 & 0 & 0.03 \\ 0.01 & 0.02 & 0 \end{bmatrix} \text{making}$$

$$A = \begin{bmatrix} 1 & 0 & 0 \\ 0 & 1 & 0 \\ 0 & 0 & 1 \end{bmatrix} - \begin{bmatrix} 0 & 0.07 & 0.1 \\ 0.05 & 0 & 0.03 \\ 0.01 & 0.02 & 0 \end{bmatrix} = \begin{bmatrix} 1 & -0.07 & -0.1 \\ -0.05 & 1 & -0.03 \\ -0.01 & -0.02 & 1 \end{bmatrix}.$$

P includes zeroes on the diagonal because no cycle member is connected to itself.

$$x = A^{-1}b = \begin{bmatrix} 1061.36 \\ 559.72 \\ 221.81 \end{bmatrix}.$$

Based on this example, the computational parameter value for first cycle node 702R1 computed in operation 918 is 1061.36; the computational parameter value for second cycle node 702R2 computed in operation 918 is 559.72; and the computational parameter value for third cycle node 702R3 computed in operation 918 is 221.81.

In an operation 922, a driver rate $$d_r = \frac{c}{d_q}$$

is computes for the selected next node based on the driver quantity $d_q$ and the computational parameter value c. For example, for first cycle node 702R1, the driver rate is computed as $$d_r = \frac{c}{d_q} = \frac{1061.36}{100} = 10.6136$$

assuming that $d_q=100$ from processing the reverse flow list for first cycle node 702R1. The driver rate d r value is stored in association with the selected next node.

In an operation 924, a determination is made concerning whether there is another outgoing edge of the selected next node that has not been selected and processed. For example, the "outgoing" node class member includes a list of outgoing edges from a node. When there is another outgoing edge that has not been selected and processed, processing continues in an operation 926. When there is not another outgoing edge that has not been selected and processed, processing continues in an operation 938 shown referring to FIG. 9B.

In operation 926, a next outgoing edge and its associated destination node is selected using the "destinationNode" edge class member of the next outgoing edge selected from the list of outgoing edges. For example, on a first iteration of operation 926, a first outgoing edge is selected from the list of outgoing edges; on a second iteration of operation 926, a second outgoing edge is selected from the list of outgoing edges; and so on until each outgoing edge in the list of outgoing edges is selected and processed. In some cases, the list of outgoing edges may be empty. Referring to FIG. 7, in cycle 700, second cycle node 702R2 and third cycle node 702R3 are both destination nodes of first cycle node 702R1.

In an operation 928, the computational parameter value c of the selected destination node is updated to combine any previous computational parameter value defined for the destination node with the contribution from the selected next node computed by multiplying the computed driver rate for the selected next node by the driver quantity computed between the selected next node and the selected destination node, for example, through addition. For illustration, the computational parameter value c for second cycle node 702R2 is updated from the computational parameter value of its incoming edges 704R1R2 and 704R3R2. Because node 702R2 is the destination node for source node 702R1 and 702R3 through cycle edges 704R1R2 and 704R3R2, respectively. The 704R1R2 cycle edge computational value is updated as 10.6136*5=53.07, where 10.6136 is the driver rate for source node 702R1, and 5 is the driver quantity for first cycle edge 704R1R2. The 704R3R2 cycle edge computational value is updated as 2.2181*3=6.65, where 2.2181 is the driver rate for source node 702R3, and 3 is the driver quantity for sixth cycle edge 704R3R2. The final computational parameter value c is updated as 500+53.07+6.65=559.72, where 500 is the input computational parameter value to cycle node 702R2. The computational parameter value c is stored in association with the selected next destination node so the value can be updated to accumulate values from more than one edge connected to the selected next destination node. Processing continues in operation 924 to process any additional destination nodes of the selected next node.

Referring to FIG. 9B, similar to operation 922, in operation 930, the driver rate $$d_r = \frac{c}{d_q}$$

is computed tor the selected next node based on the driver quantity d q, and the computational parameter value c stored in association with the selected next node. The driver rate d r value is stored in association with the selected next node.

Similar to operation 924, in an operation 932, a determination is made concerning whether there is another outgoing edge of the selected next node that has not been selected and processed. When there is another outgoing edge of the selected next node that has not been selected and processed, processing continues in an operation 934. When there is not another outgoing edge of the selected next node that has not been selected and processed, processing continues in operation 938.

Similar to operation 926, in operation 934, a next outgoing edge and its associated destination node is selected using the "destinationNode" edge class member of the next outgoing edge selected from the list of outgoing edges.

Similar to operation 928, in an operation 936, the computational parameter value c of the selected next destination node is updated, for example, by addition, and processing continues in operation 932 to process any additional outgoing edges of the selected next node.

In operation 938, a determination is made concerning whether there is another node in the forward flow list (or the reverse flow list if the reverse flow list is processed in reverse order instead of storing the forward flow list separately) that has not been selected and processed. When there is another node in the forward flow list that has not been selected and processed, processing continues in operation 914. When there is not another node in the forward flow list that has not been selected and processed, processing continues in an operation 940.

In operation 940, the driver quantities, computational parameter values, and/or driver rates may be output, for example, by storing the driver quantities, computational parameter values, and/or driver rates to flow computation results 824. In addition, or in the alternative, a graph of the data model may be presented on a second display 816, printed on a second printer 820, sent to another computing device using second communication interface 806, etc. The driver quantities, computational parameter values, and/or driver rates may be included in the graph of the data model in association with a node and/or an edge of the data model.

For illustration, flow order determination application 122 and flow computation application 822 may be used to compute demand and cost flow through the data model to understand which products, customers and segments are profitable, to identify cost reduction opportunities, and to determine what drives profitability in various industries including manufacturing, telecommunications, aviation, utilities, retail, transportation, financial Services, etc. The cost expenditure or computational parameter may be related to a cost that flows through the system as defined using the data model. Flow order determination application 122 and flow computation application 822 further may be used to forecast investments, to identify opportunities to control costs and improve process efficiency, to predict the resource implications of the changes in the output demand and to analyze cost expenditure based on demand. The impact of changes to the data model that represents the system may be analyzed.

Profit and loss reporting may be determined by customer or customer segment to target marketing strategies and resources toward acquiring, retaining, migrating, and growing the most profitable customers. By capturing costs at the activity and transaction levels, companies can assign them along with the revenues to different dimensions.

The core components or building blocks to construct a data model include dimension and dimension members, nodes, drivers, and edges. The data model may represent the structure of a business to understand the demand and cost flow in running the business. For example, a company's general ledger node name, such as wages, depreciation, etc. can be used to name the resource nodes in a data model. The hierarchy of the processes in a company can be applied to the node accounts associated with activities. The products and services of a company can be applied to the nodes associated with cost object accounts. The costs flow from resource nodes to activity nodes to cost object nodes. The cost object nodes may be the last destination nodes that show the actual expenditures that companies are investing in to make the products or services or any salable units.

The dimension members are categories by the dimension. The dimension is a root for all of the dimension members under it. The dimensions and dimension members are used to organize the company data into data modelling. The dimensions and dimension members information describe the organization and its business. The information is further used to derive the nodes and edges information. Through nodes and edges, the demand and cost flows to understand how much money a company is investing in to make the salable units.

A node may be the basic repository of costs in a data model and may be uniquely identified by a cross-section of the related dimensions. From the dimensions cross-section, a node hierarchy may be formed to understand the purpose of an account creation in the data model. Nodes are created to hold the cost expenditure in the business. For example, the cost spent on certain activities to make a product. Separate accounts may be created for each activity and product to track a complete cost expenditure.

The driver defines the method for cost distribution from one account to other nodes and is associated with a source node. The cost flow from source nodes to destination nodes through edges. The edge is the link between the two nodes from a source node to a destination node. The demand and costs flow along the edge paths from source nodes to destination nodes. The cost flows from the resource nodes to the activity nodes to the final cost object nodes. For example, the cost expenditure for the wages of employees may be assigned to perform the activities to make the final products or salable units. A source node is the source of a cost assignment. A destination node receives the results from an edge.

A performance of flow order determination application 122 and flow computation application 822 was compared to the existing flow computation method described in the CPM User's Guide. As shown in FIGS. 9A and 9B, flow computation application 822 iterates through the reverse flow list and/or the forward flow list to compute the computational parameter values. The reverse flow list and the forward flow list may be processed separately, and each list is simply the reverse of the other so only one list needs to be stored. For example, if quantities are not changed, the forward flow list may be processed without processing the reverse flow list again. A user can modify input parameter values such as parameters associated with the driver of one or more nodes of the data model or a type of driver without re-executing flow order determination application 122. The determined reverse flow list and/or forward flow list remain valid irrespective of modifications to the input parameter values. As long as the data model structure remains unchanged, the determined reverse flow list and/or forward flow list remain valid for use by flow computation application 822. To the contrary, using the CPM User's Guide, any change to the data model requires re-execution of the entire process.

Figure 10:
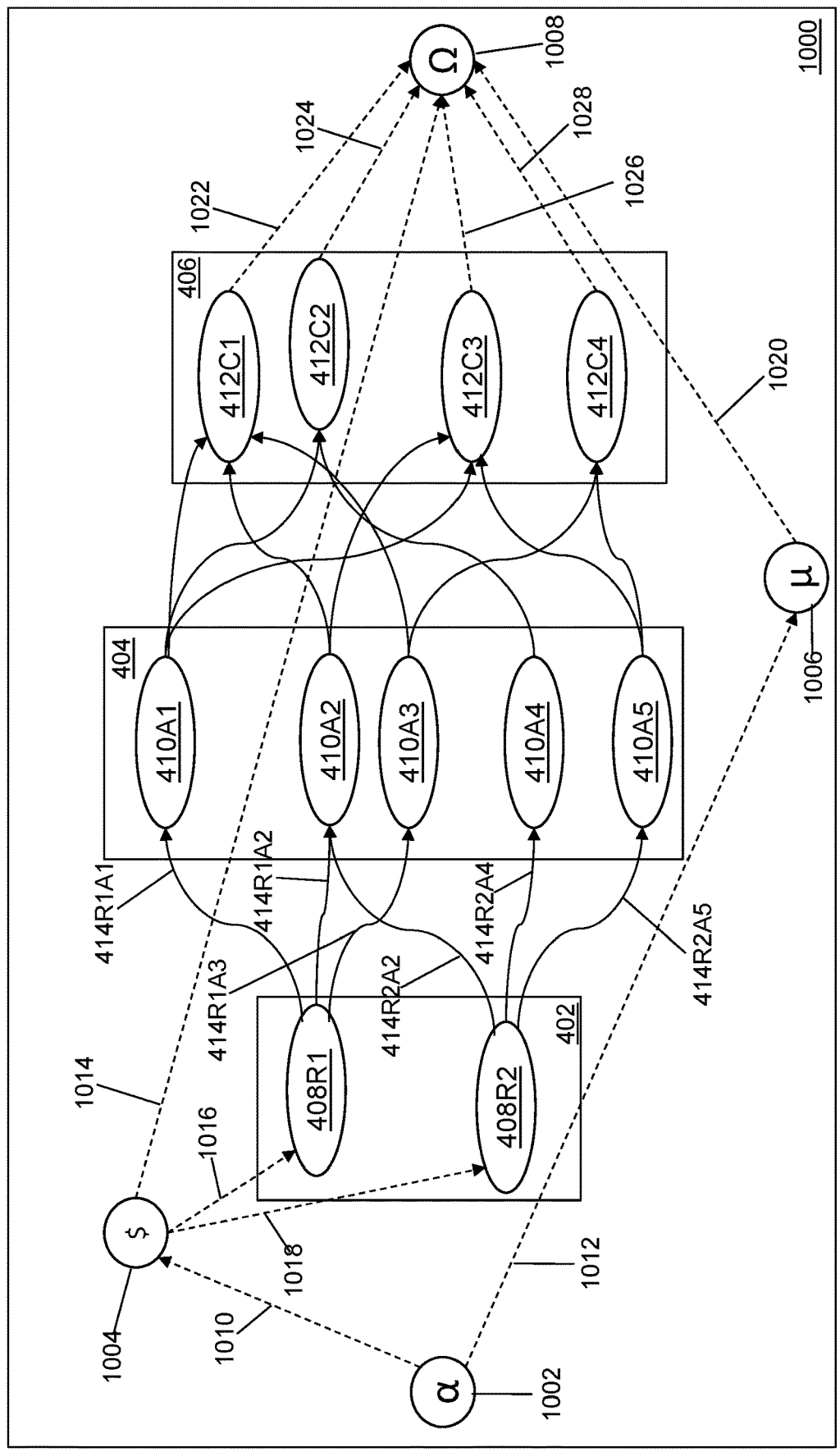
FIG. 10 shows the data model of FIG. 4 modified to create a fully connected graph as done in existing flow computation methods in accordance with an illustrative embodiment.

A recursive process instead of the iterative process described in FIGS. 9A and 9B is used by the method described in the CPM User's Guide. The method described in the CPM User's Guide further requires that the plurality of disconnected subgraphs of the data model be connected to form a single connected graph. For example, referring to FIG. 10, graph 400 has been modified to form a connected graph 1000 used by the method described in the CPM User's Guide to compute the computational parameter values. A first dummy node 1002, a second dummy node 1004, a third dummy node 1006, and a fourth dummy node 1008 have been added to graph 400.

First dummy node 1002 is connected as a source to second dummy node 1004 through a first dummy edge 1010 and to third dummy node 1006 through a second dummy edge 1012. Second dummy node 1004 is connected as a source to fourth dummy node 1008 through a third dummy edge 1014, to first source node 408R1 through a fourth dummy edge 1016, and to second source node 408R2 through a fifth dummy edge 1018. Third dummy node 1006 is connected as a source to fourth dummy node 1008 through a sixth dummy edge 1020. Fourth dummy node 1008 is connected as a destination from first end node 412C1 through a seventh dummy edge 1022, from second end node 412C2 through an eighth dummy edge 1024, from third end node 412C3 through a ninth dummy edge 1026, and from fourth end node 412C4 through a tenth dummy edge 1028. Four additional nodes and ten additional edges were required to convert graph 400 into a single connected graph.

As the size of the data model increases, the number of additional edges increases significantly increasing the memory required to store characteristics of the data model represented by connected graph 1000. Using flow computation application 822, no dummy nodes or edges are needed. Flow computation application 822 processes the reverse and/or forward flow lists created from the original data model comprised of disconnected graphs as represented, for example, by graph 400.

The reverse and forward flow lists define an iterative sequence for computing the computational parameter values with no recursion that is needed using the method described in the CPM User's Guide. The computer processing time required to perform the recursive process as opposed to the iterative process can be significantly longer as discussed further below.

Comparative results were generated comparing the computing time and computing memory used by flow order determination application 122 and flow computations application 822 relative to the method described in the CPM User's Guide. Six different data models were used to generate the results presented below. Table 1 shows the amount of computing time used by each method to process the respective data model, where s indicates seconds.

TABLE 1

| Data Model | CPM create connected graph | CPM compute demand and cost flow | CPM total | 122 | 822 | 122 and 822 |
|---|---|---|---|---|---|---|
| 1 | 11,460 s | 253 s | 11,713 s | 21 s | 230 s | 251 s |
| 2 | 3 s | 241 s | 244 s | 8 s | 99 s | 107 s |
| 3 | 2 s | 2,143 s | 2,145 s | 84 s | 812 s | 896 s |
| 4 | 19 s | 36 s | 55 s | 1 s | 31 s | 32 s |
| 5 | 2 s | 21 s | 23 s | 2 s | 19 s | 21 s |
| 6 | 11 s | 48 s | 59 s | 1 s | 42 s | 43 s |

CPM indicates the method described in the CPM User's Guide. 122 indicates the process described using flow order determination application 122. 822 indicates the process described using flow computations application 822. 122 and 822 indicates the process described using both flow order determination application 122 and flow computations application 822. All of the methods and data models were executed using 24 gigabytes (GB) of RAM, a 250 GB hard drive, and processor having a central processing unit speed of 2.7 gigahertz.

Data model 1 included 1,253,099 nodes with 11,149,652 edges, and no cycles. Data model 2 included 32,988 nodes with 7,530,000 edges, and 31 cycles. Data model 3 included 1,094,721 nodes with 8,374,251 edges, and 3,222 cycles. Data model 4 included 310,773 nodes with 356,528 edges, and one cycle. Data model 5 included 74,504 nodes with 911,244 edges, and no cycles. Data model 6 included 882,418 nodes with 188,116 edges, and no cycles.

Using all of the data models, the total processing time using flow order determination application 122 and flow computations application 822 was less than using the CPM method. Relative to data model 1, the connected graph required 3 hours and 11 minutes to create while the total processing time using flow order determination application 122 and flow computations application 822 was less than just the demand and cost flow computation time using the CPM method. Therefore, the processing time reduction using flow order determination application 122 and flow computations application 822 with data model 1 was over 3 hours and 11 minutes.

Creation of the connected graph using data models 2 and 3 was faster than defining the forward and reverse flow lists. However, the computation time using iterative processing with the forward and reverse flow lists remained much less than using the recursive process of the CPM method. As a result, the total time to process using flow order determination application 122 and flow computations application 822 remained much less using data models 2 and 3. In fact, flow order determination application 122 and flow computations application 822 were over twice as fast as using the CPM method.

Table 2 below that show the amount of hard disk memory used by each method with the same six data models, where GB indicates gigabytes.

TABLE 2

| Data Model | CPM total | 122 and 822 |
|---|---|---|
| 1 | 6 GB | 3.3 GB |
| 2 | 1.2 GB | 1.1 GB |
| 3 | 4 GB | 3.8 GB |
| 4 | 0.796 GB | 0.096 GB |
| 5 | 0.530 GB | 0.353 GB |
| 6 | 4 GB | 2.68 GB |

As already explained, the method described in the CPM User's Guide requires more memory due to the requirement to create a connected graph from the disconnected graphs. To create the connected graphs, dummy nodes and edges must be created which increases the amount of memory needed to process the data model. In contrast, no additional memory is needed to store the data model of disconnected graphs when flow order determination application 122 and flow computations application 822 are used. The disconnected graphs created by the user are used as defined with no need for dummy nodes and edges.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   determine a flow list from a data model of a system, wherein the data model is described by nodes connected by edges, wherein an edge is between a pair of nodes, wherein the pair of nodes include a source node and a destination node, wherein a directivity of the edge is from the source node to the destination node, wherein the data model includes a plurality of modules, wherein the nodes are distributed among the plurality of modules such that each node is included in a single module of the plurality of modules to define one or more module nodes included in each module, wherein the plurality of modules includes a source module and an end module, wherein the data model represents a flow of a computational parameter value through the nodes from the source module to the end module, wherein each node is connected to at least one other node in a same module or another module of the plurality of modules, wherein the flow list defines an order for selecting and iteratively processing each node to compute the computational parameter value in a single iteration through the flow list, wherein determining the flow list comprises
- (A) selecting a next module from the plurality of modules, wherein the next module is selected in an order from either the end module to the source module included in the plurality of modules or from the source module to the end module included in the plurality of modules;
- (B) when the one or more module nodes of the selected next module includes intra-module connected nodes,
  - (AA) selecting a next intra-module connected node from a plurality of intra-module connected nodes included in the one or more module nodes of the selected next module, wherein an intra-module connected node is connected to another node included in the one or more module nodes;
  - (BB) when the selected next intra-module connected node has not been processed, indicating that the selected next intra-module connected node has been processed and adding the selected next intra-module connected node to the flow list; and
  - (CC) repeating (AA) and (BB) until each intra-module connected node included in the plurality of intra-module connected nodes is selected in (AA) once;
- (C) selecting a next module node included in the selected next module, wherein the selected next module includes the one or more module nodes;
- (D) when the selected next module node has not been processed, indicating that the selected next module node has been processed and adding the selected next module node to the flow list;
- (E) repeating (C) and (D) until each module node included in the one or more module nodes is selected in (B) once; and
- (F) repeating (A) through (E) until each module included in the plurality of modules is selected in (A) once;

select each node from the flow list to compute a driver quantity for each node;

select each node from the flow list in a reverse order to compute a driver rate and the computational parameter value for each node; and output the driver quantity or the computational parameter value for each node to predict a performance of the system.

2. The non-transitory computer-readable medium of claim 1, wherein the computational parameter value represents an expenditure of a resource.

3. The non-transitory computer-readable medium of claim 2, wherein the driver quantity represents a quantity of the resource expended by a respective node.

4. The non-transitory computer-readable medium of claim 3, wherein the driver rate is computed using $$d_r = \frac{c}{d_q}$$

for the respective node, where $d_r$ represents the driver rate, $c$ represents the computational parameter value for the respective node, and $d_q$ represents the driver quantity of the respective node.

5. The non-transitory computer-readable medium of claim 1, wherein the computer-readable instructions further cause the computing device to output the determined flow list.

6. The non-transitory computer-readable medium of claim 1, wherein the plurality of modules further includes an intermediate module included between the source module and the end module.

7. The non-transitory computer-readable medium of claim 1, wherein, when determining the flow list, the next module is selected in an order from the end module to the source module included in the plurality of modules.

8. The non-transitory computer-readable medium of claim 7, wherein, when the one or more module nodes of the selected next module includes intra-module connected nodes, after (AA) and before (BB), determining the flow list further comprises:
- determining whether each outgoing edge from the selected next intra-module connected node has been processed;
- (AAA) when each outgoing edge from the selected next intra-module connected node has been processed, selecting a next incoming edge to the selected intra-module connected node;
- (BBB) when the source node of the selected next incoming edge is not a member of a cycle, increment a processed edge counter to indicate that the selected next incoming edge has been processed; and
- repeating (AAA) and (BBB) until each incoming edge to the selected intra-module connected node is selected in (AAA) once.

9. The non-transitory computer-readable medium of claim 7, wherein, when the one or more module nodes of the selected next module includes intra-module connected nodes, after (CC) and before (C), determining the flow list further comprises:
- determining whether each intra-module connected node included in the plurality of intra-module connected nodes has been processed;
- when each intra-module connected node included in the plurality of intra-module connected nodes has not been processed, resetting the next intra-module connected node in (AA) to a first intra-module connected node of the plurality of intra-module connected nodes; and
- repeating (AA) through (CC) until each intra-module connected node included in the plurality of intra-module connected nodes is selected again in (AA) once.

10. The non-transitory computer-readable medium of claim 7, wherein when the one or more module nodes of the selected next module includes intra-module connected nodes, after (AA) and before (BB), determining the flow list further comprises processing each cycle node included in a cycle when the selected next intra-module connected node is a member of the cycle and has not been processed, wherein the cycle includes a plurality of cycle nodes, wherein at least one cycle node of the plurality of cycle nodes has a return connection to another cycle node of the plurality of cycle nodes.

11. The non-transitory computer-readable medium of claim 10, wherein the return connection creates a connection loop among the plurality of cycle nodes.

12. The non-transitory computer-readable medium of claim 10, wherein processing each cycle node included in the cycle comprises:
- (AAA) when the cycle has not been processed, selecting a next cycle node from the plurality of cycle nodes;

(BBB) selecting a next incoming edge to the selected next cycle node;
(CCC) when the selected next incoming edge is not from a cycle member of the cycle, incrementing a processed edge counter to indicate that the selected next incoming edge has been processed;
(DDD) repeating (BBB) and (CCC) until each incoming edge to the selected next cycle node is selected in (BBB) once;
(EEE) when the selected next cycle node has not been processed, indicating that the selected next cycle node has been processed and adding the selected next cycle node to the flow list; and
(FFF) repeating (AAA) through (EEE) until each cycle node included in the plurality of cycle nodes is selected in (AAA) once.

13. The non-transitory computer-readable medium of claim 12, wherein after (FFF), processing each cycle node included in the cycle further comprises:
    resetting the next cycle node to a first cycle node of the plurality of cycle nodes;
    (GGG) selecting the next cycle node from the plurality of cycle nodes;
    (HHH) selecting a next incoming edge to the next cycle node selected in (GGG);
    (III) when the next incoming edge selected in (HHH) is from a second cycle member of the cycle, incrementing the processed edge counter to indicate that the next incoming edge selected in (HHH) has been processed;
    (JJJ) repeating (HHH) and (III) until each incoming edge to the selected next cycle node is selected in (HHH) once;
    (KKK) when the next cycle node selected in (GGG) has not been processed, indicating that the next cycle node selected in (GGG) has been processed and adding the next cycle node selected in (GGG) to the flow list; and
    (LLL) repeating (GGG) through (KKK) until each cycle node included in the plurality of cycle nodes is selected in (GGG) once.

14. The non-transitory computer-readable medium of claim 1, wherein, when determining the flow list,
    the next module is selected in an order from the source module to the end module included in the plurality of modules,
    and
    the computer-readable instructions further cause the computing device to reverse an order of the flow list.

15. The non-transitory computer-readable medium of claim 14, wherein, when the one or more module nodes of the selected next module includes intra-module connected nodes, after (AA) and before (BB), determining the flow list further comprises:
    determining whether each incoming edge to the selected next intra-module connected node has been processed;
    (AAA) when each incoming edge to the selected next intra-module connected node has been processed, selecting a next outgoing edge from the selected intra-module connected node;
    (BBB) when the source node of the selected next outgoing edge is not a member of a cycle, increment a processed edge counter to indicate that the selected next outgoing edge has been processed; and
    repeating (AAA) and (BBB) until each outgoing edge from the selected intra-module connected node is selected in (AAA) once.

16. The non-transitory computer-readable medium of claim 14, wherein, when the one or more module nodes of the selected next module includes intra-module connected nodes, after (CC) and before (C), determining the flow list further comprises:
    determining whether each intra-module connected node included in the plurality of intra-module connected nodes has been processed;
    when each intra-module connected node included in the plurality of intra-module connected nodes has not been processed, resetting the next intra-module connected node in (AA) to a first intra-module connected node of the plurality of intra-module connected nodes; and
    repeating (AA) through (CC) until each intra-module connected node included in the plurality of intra-module connected nodes is selected again in (AA) once.

17. The non-transitory computer-readable medium of claim 14, wherein when the one or more module nodes of the selected next module includes intra-module connected nodes, after (AA) and before (BB), determining the flow list further comprises processing each cycle node included in a cycle when the selected next intra-module connected node is a member of the cycle and has not been processed, wherein the cycle includes a plurality of cycle nodes, wherein at least one cycle node of the plurality of cycle nodes has a return connection to another cycle node of the plurality of cycle nodes.

18. The non-transitory computer-readable medium of claim 17, wherein the return connection creates a connection loop among the plurality of cycle nodes.

19. The non-transitory computer-readable medium of claim 17, wherein processing each cycle node included in the cycle comprises:
    (AAA) when the cycle has not been processed, selecting a next cycle node from the plurality of cycle nodes;
    (BBB) selecting a next outgoing edge from the selected next cycle node;
    (CCC) when the selected next outgoing edge is to a cycle member of the cycle, incrementing a processed edge counter to indicate that the selected next outgoing edge has been processed;
    (DDD) repeating (BBB) and (CCC) until each outgoing edge from the selected next cycle node is selected in (BBB) once;
    (EEE) when the selected next cycle node has not been processed, indicating that the selected next cycle node has been processed and adding the selected next cycle node to the flow list; and
    (FFF) repeating (AAA) through (EEE) until each cycle node included in the plurality of cycle nodes is selected in (AAA) once.

20. The non-transitory computer-readable medium of claim 19, wherein after (FFF), processing each cycle node included in the cycle further comprises:
    resetting the next cycle node to a first cycle node of the plurality of cycle nodes;
    (GGG) selecting the next cycle node from the plurality of cycle nodes;
    (HHH) selecting a next outgoing edge from the next cycle node selected in (GGG);
    (III) when the next outgoing edge selected in (HHH) is not to a second cycle member of the cycle, incrementing the processed edge counter to indicate that the next outgoing edge selected in (HHH) has been processed;
    (JJJ) repeating (HHH) and (III) until each outgoing edge from the selected next cycle node is selected in (HHH) once;

(KKK) when the next cycle node selected in (GGG) has not been processed, indicating that the next cycle node selected in (GGG) has been processed and adding the next cycle node selected in (GGG) to the flow list; and (LLL) repeating (GGG) through (KKK) until each cycle node included in the plurality of cycle nodes is selected in (GGG) once.

21. The non-transitory computer-readable medium of claim 1, wherein after outputting the driver quantity or the computational parameter value for each node, the computer-readable instructions further cause the computing device to:

read an updated data model of the system, wherein the data model description is modified, but the nodes and the connected edges remain unchanged;

select each node from the flow list to update the driver quantity for each node;

select each node from the flow list in the reverse order to update the driver rate and the computational parameter value for each node; and output the driver quantity or the computational parameter value updated for each node to predict a second performance of the system described by the updated data model.

22. The non-transitory computer-readable medium of claim 21, wherein the data model description is modified based on a driver definition change for any node of the one or more module nodes.

23. The non-transitory computer-readable medium of claim 1, wherein after outputting the driver quantity or the computational parameter value for each node, the computer-readable instructions further cause the computing device to:

read an updated data model of the system, wherein the data model description is modified by changing an input expenditure value, but the nodes and the connected edges remain unchanged;

select each node from the flow list in the reverse order to update the driver rate and the computational parameter value for each node based on the changed input expenditure value; and output the computational parameter value updated for each node to predict a second performance of the system described by the updated data model.

24. The non-transitory computer-readable medium of claim 1, wherein selecting each node from the flow list to compute the driver quantity for each node comprises:

(AAA) selecting a next node from the flow list starting from a beginning of the flow list;

(BBB) when the selected next node has an incoming edge,
(AAAA) selecting a next incoming edge of the selected next node;
(BBBB) selecting the source node of the selected next incoming edge;
(CCCC) computing the driver quantity for the selected next node based on a driver associated with the selected source node; and
(DDDD) repeating (AAAA) through (CCCC) until each incoming edge of the selected next node is selected in (AAAA) once; and (CCC) repeating (AAA) and (BBB) until each node from the flow list is selected in (AAA).

25. The non-transitory computer-readable medium of claim 24, wherein selecting each node from the flow list in the reverse order to compute the driver rate and the computational parameter value for each node comprises:

(DDD) selecting a next reverse node starting from an end of the flow list;

(EEE) when the selected next reverse node is not a first cycle member of a cycle, wherein the cycle includes a plurality of cycle nodes, wherein at least one cycle node of the plurality of cycle nodes has a return connection to another cycle node of the plurality of cycle nodes,
(AAAAA) computing a driver rate for the selected next reverse node based on the computational parameter values previously computed;
(BBBBB) when the selected next reverse node has an outgoing edge,
(CCCCC) selecting a next outgoing edge from the selected next reverse node;
(DDDDD) computing the computational parameter value for the selected next reverse node based on the computed driver rate for the source node of the selected next outgoing edge; and
(EEEEE) repeating (CCCCC) through (DDDDD) until each outgoing edge of the selected next reverse node is selected in (CCCCC) once; and (FFF) repeating (DDD) and (EEE) until each node from the flow list is selected in (DDD).

26. The non-transitory computer-readable medium of claim 25, wherein, after (DDD) and before (FFF), selecting each node from the flow list in the reverse order to compute the driver rate and the computational parameter value for each node further comprises:

when the selected next reverse node is the first cycle member, computing the computational parameter value and the driver rate for each member of the cycle.

27. A computing device comprising:

a processor; and a non-transitory computer-readable medium operably coupled to the processor, the computer-readable medium having computer-readable instructions stored thereon that, when executed by the processor, cause the computing device to determine a flow list from a data model of a system, wherein the data model is described by nodes connected by edges, wherein an edge is between a pair of nodes, wherein the pair of nodes include a source node and a destination node, wherein a directivity of the edge is from the source node to the destination node, wherein the data model includes a plurality of modules, wherein the nodes are distributed among the plurality of modules such that each node is included in a single module of the plurality of modules to define one or more module nodes included in each module, wherein the plurality of modules includes a source module and an end module, wherein the data model represents a flow of a computational parameter value through the nodes from the source module to the end module, wherein each node is connected to at least one other node in a same module or another module of the plurality of modules, wherein the flow list defines an order for selecting and iteratively processing each node to compute the computational parameter value in a single iteration through the flow list, wherein determining the flow list comprises (A) selecting a next module from the plurality of modules, wherein the next module is selected in an order from either the end module to the source module included in the plurality of modules or from the source module to the end module included in the plurality of modules;

(B) when the one or more module nodes of the selected next module includes intra-module connected nodes,
  (AA) selecting a next intra-module connected node from a plurality of intra-module connected nodes included in the one or more module nodes of the selected next module, wherein an intra-module connected node is connected to another node included in the one or more module nodes;
  (BB) when the selected next intra-module connected node has not been processed, indicating that the selected next intra-module connected node has been processed and adding the selected next intra-module connected node to the flow list; and
  (CC) repeating (AA) and (BB) until each intra-module connected node included in the plurality of intra-module connected nodes is selected in (AA) once;
(C) selecting a next module node included in the selected next module, wherein the selected next module includes the one or more module nodes;
(D) when the selected next module node has not been processed, indicating that the selected next module node has been processed and adding the selected next module node to the flow list;
(E) repeating (C) and (D) until each module node included in the one or more module nodes is selected in (B) once; and
(F) repeating (A) through (E) until each module included in the plurality of modules is selected in (A) once;
select each node from the flow list to compute a driver quantity for each node;
select each node from the flow list in a reverse order to compute a driver rate and the computational parameter value for each node; and
output the driver quantity or the computational parameter value for each node to predict a performance of the system.

28. A method of determining a node traversal order for computing a computational parameter value for each node of a data model of a system that includes a plurality of disconnected graphs, the method comprising:
determining, by a computing device, a flow list from a data model of a system, wherein the data model is described by nodes connected by edges, wherein an edge is between a pair of nodes, wherein the pair of nodes include a source node and a destination node, wherein a directivity of the edge is from the source node to the destination node, wherein the data model includes a plurality of modules, wherein the nodes are distributed among the plurality of modules such that each node is included in a single module of the plurality of modules to define one or more module nodes included in each module, wherein the plurality of modules includes a source module and an end module, wherein the data model represents a flow of a computational parameter value through the nodes from the source module to the end module, wherein each node is connected to at least one other node in a same module or another module of the plurality of modules, wherein the flow list defines an order for selecting and iteratively processing each node to compute the computational parameter value in a single iteration through the flow list wherein determining the flow list comprises
(A) selecting a next module from the plurality of modules, wherein the next module is selected in an order from either the end module to the source module included in the plurality of modules or from the source module to the end module included in the plurality of modules;
(B) when the one or more module nodes of the selected next module includes intra-module connected nodes,
  (AA) selecting a next intra-module connected node from a plurality of intra-module connected nodes included in the one or more module nodes of the selected next module, wherein an intra-module connected node is connected to another node included in the one or more module nodes;
  (BB) when the selected next intra-module connected node has not been processed, indicating that the selected next intra-module connected node has been processed and adding the selected next intra-module connected node to the flow list; and
  (CC) repeating (AA) and (BB) until each intra-module connected node included in the plurality of intra-module connected nodes is selected in (AA) once:
(C) selecting a next module node included in the selected next module, wherein the selected next module includes the one or more module nodes;
(D) when the selected next module node has not been processed, indicating that the selected next module node has been processed and adding the selected next module node to the flow list;
(E) repeating (C) and (D) until each module node included in the one or more module nodes is selected in (B) once; and
(F) repeating (A) through (E) until each module included in the plurality of modules is selected in (A) once;
selecting, by the computing device, each node from the flow list to compute a driver quantity for each node;
selecting, by the computing device, each node from the flow list in a reverse order to compute a driver rate and the computational parameter value for each node; and
outputting, by the computing device, the driver quantity or the computational parameter value for each node to predict a performance of the system.

29. The method of claim 28, wherein, when determining the flow list, the next module is selected in an order from the end module to the source module included in the plurality of modules.

30. The method of claim 28, wherein, when determining the flow list, the next module is selected in an order from the source module to the end module included in the plurality of modules, and the method further comprises reversing an order of the flow list.

* * * * *